US012458247B2

(12) United States Patent
Kajitani

(10) Patent No.: US 12,458,247 B2
(45) Date of Patent: Nov. 4, 2025

(54) STEP WIDTH MEASUREMENT DEVICE, MEASUREMENT SYSTEM, STEP WIDTH MEASUREMENT METHOD, AND PROGRAM FOR DECISION MAKING RELATED TO USER'S WALKING

(71) Applicant: NEC Corporation, Tokyo (JP)

(72) Inventor: Hiroshi Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/519,396

(22) Filed: Nov. 27, 2023

(65) Prior Publication Data
US 2024/0081687 A1 Mar. 14, 2024

Related U.S. Application Data

(63) Continuation of application No. 17/572,872, filed on Jan. 11, 2022, now abandoned.

(30) Foreign Application Priority Data

Jan. 29, 2021 (JP) .................................. 2021-012549

(51) Int. Cl.
A61B 5/11 (2006.01)
A61B 5/00 (2006.01)

(52) U.S. Cl.
CPC ............ *A61B 5/112* (2013.01); *A61B 5/6807* (2013.01); *A61B 2562/0219* (2013.01)

(58) Field of Classification Search
CPC .................. A61B 5/112; A61B 5/6807; A61B 2562/0219
See application file for complete search history.

(56) References Cited

U.S. PATENT DOCUMENTS

2018/0235831 A1* 8/2018 Jang ...................... A61B 5/7264
2020/0000373 A1* 1/2020 Agrawal .............. A61B 5/7405
2020/0047026 A1* 2/2020 Onuki ................. A63B 71/0622

FOREIGN PATENT DOCUMENTS

JP 2001-221853 A 8/2001
JP 2006-167001 A 6/2006
JP 2016-137228 A 8/2016

(Continued)

OTHER PUBLICATIONS

US Office Action for U.S. Appl. No. 17/572,872, mailed on May 30, 2024.

(Continued)

*Primary Examiner* — Alex M Valvis
*Assistant Examiner* — Anna Roberts
(74) *Attorney, Agent, or Firm* — Sughrue Mion, PLLC

(57) ABSTRACT

A step width measurement device includes a distance calculation unit that calculates a distance between both feet of a user by using propagation data related to transmission/reception times of ultrasonic waves transmitted/received by ultrasonic transmission/reception devices mounted on each of the both feet of the user, a height calculation unit that calculates a height of a sensor by using sensor data including a spatial acceleration and a spatial angular velocity measured by sensors mounted on each of the both feet of the user, and a step width calculation unit that calculates a step width of the user by using the distance between the both feet measured at the same timing and the height of the sensor.

8 Claims, 26 Drawing Sheets

(56) References Cited

FOREIGN PATENT DOCUMENTS

JP            6307673 B1    4/2018
JP            6783013 B2    11/2020

OTHER PUBLICATIONS

Translation of JP2001221853A to Yamauchi Noboru (Year: 2001).
JP Office Communication for JP Application No. 2021-012549, mailed on Aug. 20, 2024 with English Translation.
Ataka Shigemichi et al, "Trial measurement of unrestraint three-dimensional foot track by using acceleration sensor", IEICE Technical Report vol. 106 No. 490, Japan, The Institute of Electronics, Information and Communication Engineers, Jan. 19, 2007, pp. 49-pp. 54.
US Office Action for U.S. Appl. No. 17/572,872, mailed on Nov. 21, 2024.
US Office Communication for U.S. Appl. No. 18/519,464, mailed on Dec. 18, 2024.

\* cited by examiner

STEP WIDTH MEASUREMENT DEVICE, MEASUREMENT SYSTEM, STEP WIDTH MEASUREMENT METHOD, AND PROGRAM FOR DECISION MAKING RELATED TO USER'S WALKING

This application is a Continuation of U.S. application Ser. No. 17/572,872 filed on Jan. 11, 2022, which is based upon and claims the benefit of priority from Japanese Patent Application No. 2021-012549, filed on Jan. 29, 2021, the disclosure of which is incorporated herein in its entirety by reference.

TECHNICAL FIELD

The present disclosure relates to a step width measurement device or the like that measures a gait parameter.

BACKGROUND ART

With growing interest in healthcare, services for measuring gait including walking characteristics and providing information relevant to the measured gait to users are getting attention. If gait parameters such as a step width, a stride, and a foot angle can be detected from the data related to walking, a service according to the gait can be provided. For example, a step width, which is one of the gait parameters, is an indicator of a condition of a pedestrian. Therefore, when the step width in daily walking can be measured, there is a possibility that an appropriate service according to the condition of the pedestrian can be provided.

Patent Literature 1 (Japanese Patent No. 6307673) discloses a system that measures an interval between two limbs during walking or running. Patent Literature 1 discloses an example of measuring an interval between both feet (also referred to as a distance between both feet) using a non-contact interval measurement instrument using an ultrasonic wave.

In the method of Patent Literature 1, an ultrasonic wave emitted from an ultrasonic transmitting unit provided on one foot is received by a wave receiving unit provided on the other foot, and a distance between both feet is calculated based on a propagation time of the ultrasonic wave. According to the method of Patent Literature 1, it is possible to measure the interval between the ultrasonic wave transmitting unit provided on one foot and the wave receiving unit provided on the other foot as a distance between both feet during walking or running. However, in the method of Patent Literature 1, although the distance between both feet at the time of walking or running can be measured, the step width cannot be measured.

An object of the present disclosure is to provide a step width measurement device and the like capable of measuring a step width during daily walking.

SUMMARY

A step width measurement device according to an aspect of the present disclosure including a distance calculation unit that calculates a distance between both feet of a user by using propagation data related to transmission/reception times of ultrasonic waves transmitted/received by ultrasonic transmission/reception devices mounted on each of the both feet of the user, a height calculation unit that calculates a height of a sensor by using sensor data including a spatial acceleration and a spatial angular velocity measured by sensors mounted on each of the both feet of the user, and a step width calculation unit that calculates a step width of the user by using the distance between the both feet measured at the same timing and the height of the sensor.

According to an aspect of the present disclosure, there is provided a step width measurement method, in which a computer calculates a distance between both feet of a user by using propagation data related to transmission/reception times of an ultrasonic wave transmitted/received by ultrasonic transmission/reception devices mounted on each of the both feet of the user, calculates a height of a sensor by using sensor data including a spatial acceleration and a spatial angular velocity measured by sensors mounted on each of the both feet of the user, and calculates a step width of the user by using the distance between the both feet measured at the same timing and the height of the sensor.

According to an aspect of the present disclosure, there is provided a program causing a computer to perform the following: calculating a distance between both feet of a user by using propagation data related to transmission/reception times of ultrasonic waves transmitted/received by ultrasonic transmission/reception devices mounted on each of the both feet of the user, calculating a height of a sensor by using sensor data including a spatial acceleration and a spatial angular velocity measured by sensors mounted on each of the both feet of the user, and calculating a step width of the user by using the distance between the both feet measured at the same timing and the height of the sensor.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
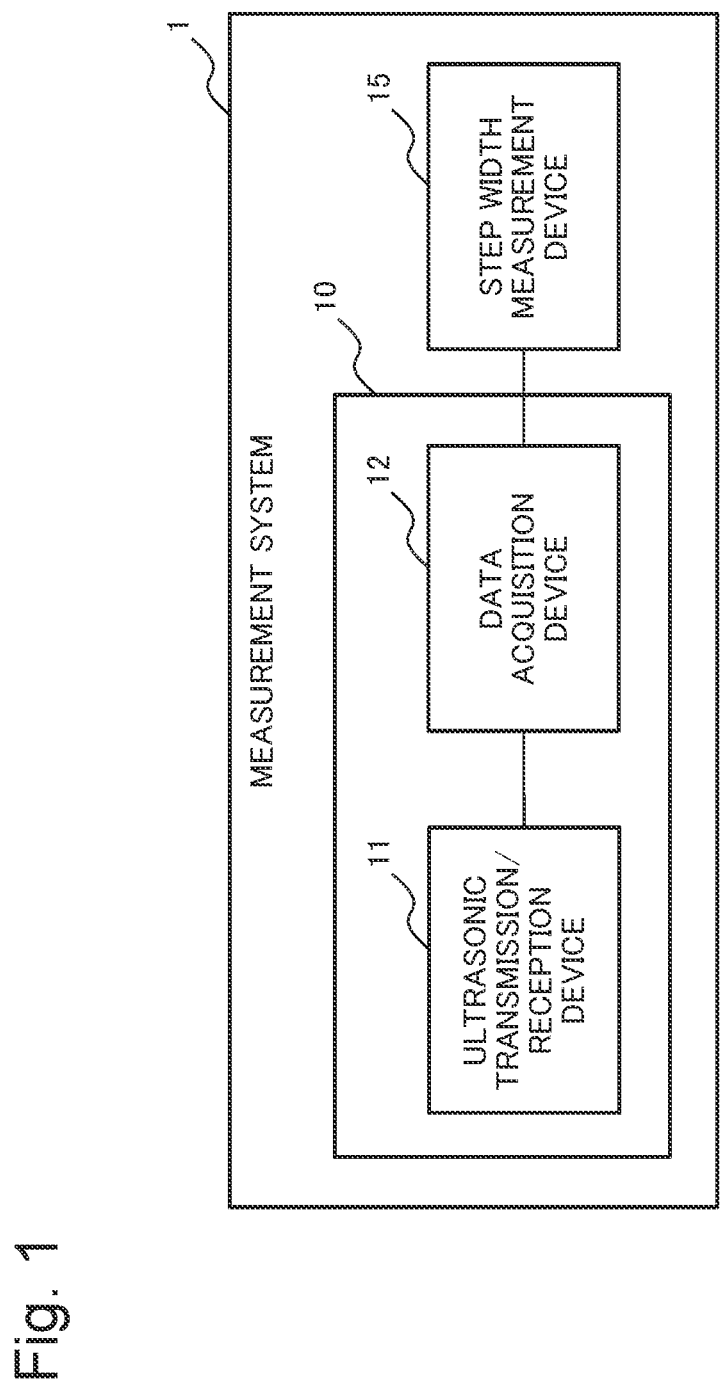
FIG. 1 is a block diagram illustrating an example of a configuration of a measurement system according to a first example embodiment.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, an information processing system according to a first example embodiment of the present invention will be described with reference to the drawings. The information processing system according to the present example embodiment includes an information processing apparatus that has a function of protecting a storage area and protects information stored in the storage area using an encrypted file system. For example, the information processing apparatus of the present example embodiment is arranged in the vicinity of a data acquisition device such as a sensor or a measurement instrument, and analyzes data acquired by the data acquisition device. The information processing apparatus according to the present example embodiment transmits necessary data among data acquired by the data acquisition device to a data processing apparatus configured in a server or the like arranged at a remote location.

(Configuration)

FIG. 1 is a block diagram illustrating an example of a configuration of a measurement system 1 according to the present example embodiment. The measurement system 1 includes an ultrasonic transmission/reception device 11, a data acquisition device 12, and a step width measurement device 15. The ultrasonic transmission/reception device 11 and the data acquisition device 12 constitute a data measurement device 10. The ultrasonic transmission/reception device 11 and the data acquisition device 12 are connected in a wired manner. The data acquisition device 12 and the step width measurement device 15 may be connected in a wired or wireless manner. The ultrasonic transmission/reception device 11, the data acquisition device 12, and the step width measurement device 15 may be constituted by a single device. Furthermore, the measurement system 1 may not include the ultrasonic transmission/reception device 11 or the data acquisition device 12, and may be constituted by only the step width measurement device 15.

Figure 2:
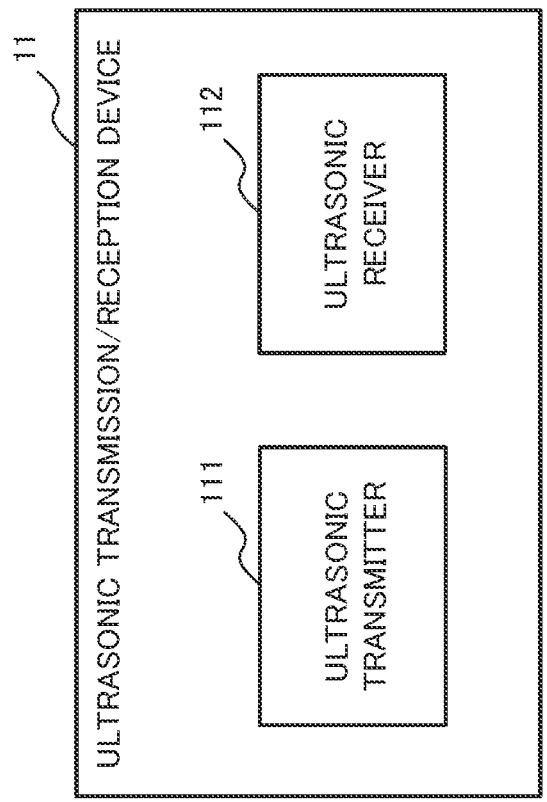
FIG. 2 is a block diagram illustrating an example of a configuration of an ultrasonic transmission/reception device included in the measurement system according to the first example embodiment.

FIG. 2 is a block diagram illustrating an example of a configuration of the ultrasonic transmission/reception device 11. The ultrasonic transmission/reception device 11 includes at least one ultrasonic transmitter 111 and at least one ultrasonic receiver 112. The ultrasonic transmitter 111 and the ultrasonic receiver 112 are common ultrasonic sensors. The ultrasonic transmission/reception device 11 may include at least one ultrasonic transmitter 111 and at least one ultrasonic receiver 112. A single ultrasonic transmission/reception device capable of transmitting and receiving ultrasonic waves may be configured as the ultrasonic transmission/reception device 11. For example, when a transmission time zone of an ultrasonic wave and a reception time zone of a reflected wave of the ultrasonic wave are divided, the ultrasonic wave can be transmitted/received by a single transducer (not illustrated).

Figure 3:
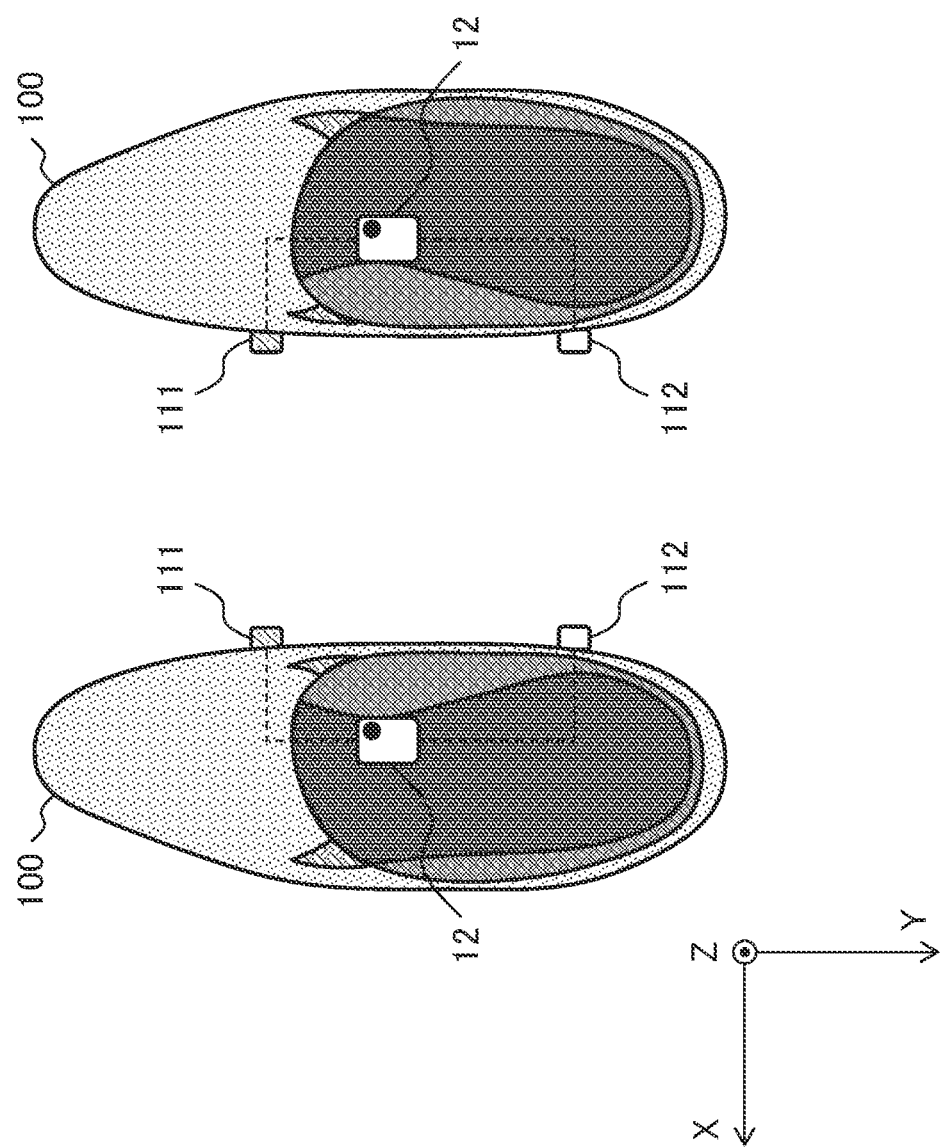
FIG. 3 is a block diagram illustrating an arrangement example of a data acquisition device, an ultrasonic transmitter, and an ultrasonic receiver included in the measurement system according to the first example embodiment.

FIG. 3 is a conceptual diagram illustrating an example in which the ultrasonic transmitter 111, the ultrasonic receiver 112, and the data acquisition device 12 are arranged on a shoe 100. The ultrasonic transmitter 111 and the ultrasonic receiver 112 are connected to the data acquisition device 12 in a wired manner. The ultrasonic transmitter 111, the ultrasonic receiver 112, and the data acquisition device 12 may be integrated. The ultrasonic transmitters 111 installed in left and right shoes 100 may transmit ultrasonic waves of the same frequency band, or may transmit ultrasonic waves of different frequency bands. The ultrasonic transmitters 111 installed in the left and right shoes 100 may transmit ultrasonic waves of the same pulse width, or may transmit ultrasonic waves of different pulse widths. When the ultrasonic transmitters 111 installed in the left and right shoes 100 transmit ultrasonic waves having different frequency bands and pulse widths, it is possible to distinguish a transmission source of the received ultrasonic wave according to a frequency band or a pulse width of the reflected wave of the ultrasonic wave received by the ultrasonic receiver 112.

The ultrasonic transmission/reception device 11 transmits pulsed ultrasonic waves (also referred to as transmitted ultrasonic waves) from the ultrasonic transmitter 111 under control of the data acquisition device 12. For example, the ultrasonic transmitter 111 converts a pulse generated by the data acquisition device 12 into a transmitted ultrasonic wave by the transducer (not illustrated) and transmits the ultrasonic wave. In the ultrasonic transmission/reception device 11, the reflected wave of the ultrasonic wave transmitted from the ultrasonic transmitter 111 is received by the ultrasonic receiver 112. For example, the ultrasonic receiver 112 converts the reflected wave of the ultrasonic wave transmitted from the ultrasonic transmitter 111 into an electric signal by the transducer (not illustrated). The ultrasonic transmission/reception device 11 outputs the converted electric signal to the data acquisition device 12.

The ultrasonic transmitter 111 mounted on the right foot is arranged outside the shoe 100 of the right foot in such a way that a transmission unit of the ultrasonic wave faces the inside of the left foot (foot side surface on a thumb side). The ultrasonic receiver 112 mounted on the right foot is arranged outside the shoe 100 of the right foot in such a way that a reception unit of the ultrasonic wave faces the inside of the left foot (foot side surface on a thumb side). The ultrasonic transmitter 111 mounted on the left foot is arranged outside the shoe 100 of the left foot in such a way that the transmission unit of the ultrasonic waves faces an inside of the right foot. The ultrasonic receiver 112 mounted on the left foot is arranged outside the shoe 100 of the left foot in such a way that a reception unit of the ultrasonic wave faces the inside of the right foot. The ultrasonic transmitter 111 and the ultrasonic receiver 112 may be mounted inside the left and right shoes 100 of the user. For example, by opening a through hole or providing a mesh-like part in a part of the shoe 100 which the transmission unit of the ultrasonic transmitter 111 and the reception unit of the ultrasonic receiver 112 face, the ultrasonic transmitter 111 and the ultrasonic receiver 112 can be arranged inside the shoe 100.

The ultrasonic transmitter 111 transmits the transmitted ultrasonic waves under the control of the data acquisition device 12. The frequency of the ultrasonic wave transmitted by the ultrasonic transmitter 111 may be set to a frequency suitable for distance measurement. For example, the ultrasonic transmitter 111 transmits the transmitted ultrasonic waves at a frequency of 40 kilohertz (kHz). The ultrasonic transmitter 111 transmits the transmitted ultrasonic wave according to the transmission pulse set by the data acquisition device 12. The pulse width of the transmission pulse of the transmitted ultrasonic wave is preferably set in accordance with the measurement cycle by the data acquisition device 12. For example, in a case where a measurement cycle by the data acquisition device 12 is 100 Hz, the pulse width of the transmission pulse is preferably set to 20 to 80 kHz. The ultrasonic waves transmitted from the ultrasonic transmitter 111 propagate in the air and are reflected on the inside of a foot on an opposite side. The reflected wave of the transmitted ultrasonic wave reflected inside the opposite foot is received by the ultrasonic receiver 112.

The ultrasonic receiver 112 receives the reflected wave of the ultrasonic wave (hereinafter, also simply referred to as a reflected wave) transmitted from the ultrasonic transmitter 111. The ultrasonic receiver 112 converts the received reflected wave into an electrical signal. The ultrasonic receiver 112 outputs the electric signal based on the reflected wave to the data acquisition device 12. In addition, the ultrasonic receiver 112 may also receive the ultrasonic waves transmitted from the ultrasonic transmitter 111 mounted on the foot on the opposite side (also referred to as the opposite foot). In a case where the ultrasonic wave transmitted from the ultrasonic transmitter 111 mounted on the opposite foot is received, it is preferable that the frequency bands or the pulse widths of the ultrasonic waves transmitted from the ultrasonic transmitters 111 mounted on each of both feet are configured to be different. When the frequency bands or the pulse widths of the ultrasonic waves transmitted from the ultrasonic transmitters 111 mounted on each of both feet are different, a transmission source of the transmitted ultrasonic wave can be distinguished.

The data acquisition device 12 drives and controls the ultrasonic transmitter 111 to transmit the transmitted ultrasonic wave from the ultrasonic transmitter 111. The data acquisition device 12 outputs a transmission pulse for setting a pulse width of the transmitted ultrasonic wave to the ultrasonic transmitter 111. The ultrasonic transmitter 111 transmits the transmitted ultrasonic wave relevant to the transmission pulse output from the data acquisition device 12 under the control of the data acquisition device 12.

The data acquisition device 12 acquires the electric signal based on the reflected wave of the transmitted ultrasonic wave from the ultrasonic receiver 112. The transmitted ultrasonic waves spread radially in the air or are absorbed by the air, and as a result, signal intensity attenuates according to a propagation distance in the air. Therefore, the data acquisition device 12 amplifies the electric signal based on the reflected wave. For example, the data acquisition device 12 detects a peak from the amplified electrical signal and specifies the time of the detected peak.

The data acquisition device 12 generates data (also referred to as propagation data) in which the transmission time of the transmitted ultrasonic wave is associated with the reception time of the reflected wave of the transmitted ultrasonic wave. The data acquisition device 12 generates the propagation data by associating transmission times of a plurality of ultrasonic waves constituting a transmitted ultrasonic wave relevant to a transmission pulse with reception times of a plurality of ultrasonic waves constituting a transmission pulse. The data acquisition device 12 transmits the generated propagation data to the step width measurement device 15. The propagation data transmitted to the step width measurement device 15 is used for measuring the step width.

In addition, the data acquisition device 12 includes an acceleration sensor and an angular velocity sensor. The data acquisition device 12 measures, as a physical quantity related to movement of a foot of a user wearing a footwear, a physical quantity related to the movement of the foot such as the spatial acceleration and the spatial angular velocity. The physical quantity related to the movement of the foot measured by the data acquisition device 12 includes not only the acceleration or the angular velocity, but also the velocity and the angle calculated by integrating the acceleration or the angular velocity. In addition, the physical quantity related to the movement of the foot measured by the data acquisition device 12 also includes a position (trajectory) calculated by second-order integration of acceleration. In addition, the physical quantity related to the movement of the foot measured by the data acquisition device 12 also includes a jerk or an angular acceleration calculated by differentiating the acceleration or the angular velocity.

The data acquisition device 12 is achieved by, for example, an inertial measurement device including an acceleration sensor and an angular velocity sensor. An example of the inertial measurement device is an inertial measurement unit (IMU). The IMU includes a three-axis acceleration sensor and a three-axis angular velocity sensor. The inertial measurement device may be achieved by a vertical gyro (VG), an attitude heading (AHRS), a global positioning system/inertial navigation system (GPS/INS), or the like. The data acquisition device 12 converts physical quantities measured by the acceleration sensor and the angular velocity sensor into digital data (also referred to as sensor data). Similarly to the propagation data, the data acquisition device 12 transmits the converted sensor data to the step width measurement device 15.

For example, the data acquisition device 12 is connected to the step width measurement device 15 mounted on a server or the like via a mobile terminal (not illustrated) carried by the user. A mobile terminal (not illustrated) is a communicator that can be carried by a user. For example, the mobile terminal is a mobile communicator having a communication function, such as a smartphone, a smart watch, or a mobile phone. The mobile terminal receives from the data acquisition device 12 the sensor data and the propagation data related to the movement of the foot of the user. The mobile terminal transmits the received sensor data and propagation data to a server or the like on which the step width measurement device 15 is mounted. The function of the step width measurement device 15 may be achieved by an application installed in a mobile terminal. In that case, the mobile terminal processes the received sensor data with application software installed in the mobile terminal.

In the example of FIG. 3, the data acquisition device 12 is arranged at a position relevant to a back side of an arch of the left and right feet. In the present example embodiment, the data acquisition device 12 produced with the same specification is arranged in the left and right shoes 100 without distinction between the left and right. It is assumed that an up-down direction (Z-axis direction) of the data acquisition devices 12 arranged on the left and right shoes 100 coincide with each other. Therefore, axes set in the sensor data derived from the left foot and the sensor data derived from the right foot are common to the left and right. In the example of FIG. 2, a local coordinate system including an x-axis in a left-right direction, a y-axis in a front-rear direction, and a z-axis in an up-down direction is set in the data acquisition device 12. In the x axis, a left side is positive, in the y axis, a rear side is positive, and in a z-axis, an upper side is positive. The direction of the axis set in the data acquisition device 12 is not limited to the example of FIG. 3 as long as the left and right feet are the same.

For example, the data acquisition device 12 is arranged in an insole inserted into the shoe 100. For example, the data acquisition device 12 may be arranged on a bottom surface or a main body of the shoe 100. The data acquisition device 12 may be detachable from the shoe 100 or may not be detachable from the shoe 100. The data acquisition device 12 may be arranged at a position other than the back side of the arch of foot as long as the sensor data related to the movement of the foot can be acquired. For example, the data acquisition device 12 may be installed on a sock worn by the user or a decorative article such as an anklet mounted by the user. For example, the data acquisition device 12 may be directly mounted on the foot or embedded in the foot. For example, the data acquisition device 12 may be located outside the shoe 100.

Figure 4:
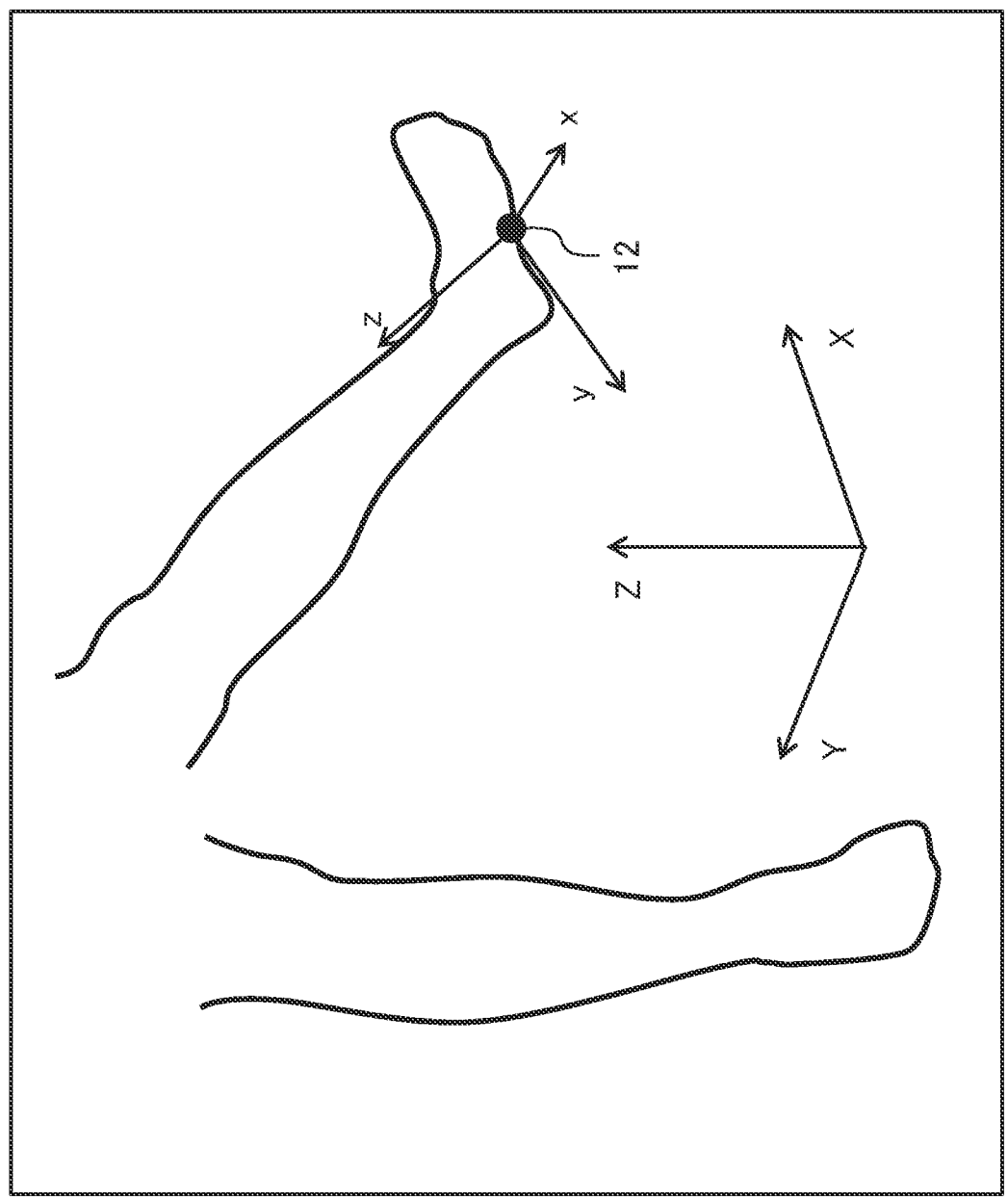
FIG. 4 is a conceptual diagram for describing a coordinate system set in the measurement system according to the first example embodiment.

FIG. 4 is a conceptual diagram for describing a local coordinate system (x-axis, y-axis, and z-axis) set in the data acquisition device 12 and a world coordinate system (X axis, Y axis, and Z axis) set with respect to the ground in the case where the data acquisition device 12 is installed on the back side of the arch of foot. In the world coordinate system (X axis, Y axis, and Z axis), in a state where the user is standing upright, a lateral direction of the user is set to an X-axis direction (a leftward direction is positive), a direction of a back surface of the user is set to a Y-axis direction (a rearward direction is positive), and a gravity direction (also referred to as a vertical direction) is set to a Z-axis direction (a vertically upward direction is positive). In the present example embodiment, a local coordinate system including an x direction, a y direction, and a z direction based on the data acquisition device 12 is set. In the present example embodiment, the coordinate systems in the same direction are set for the left and right feet.

Figure 5:
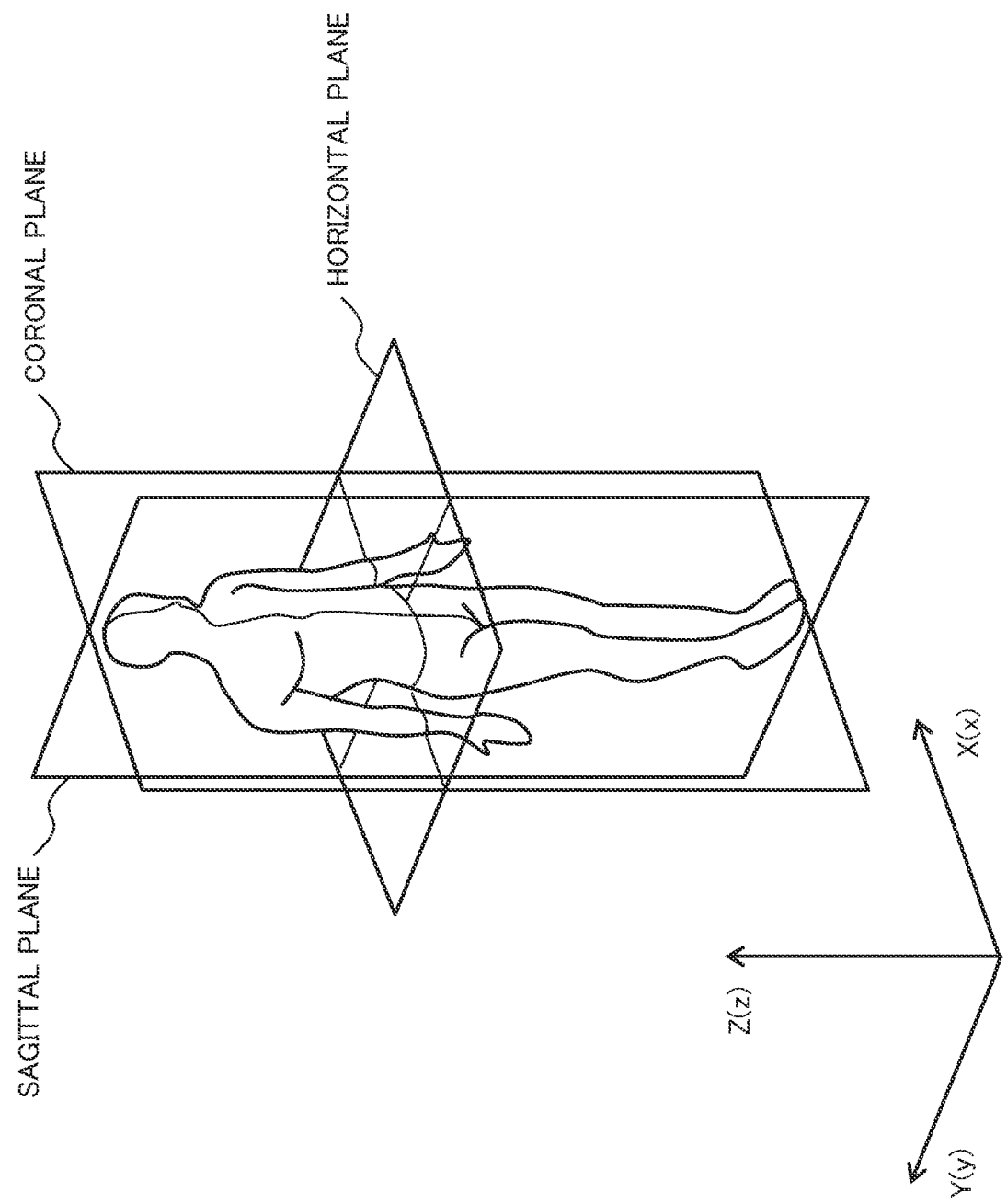
FIG. 5 is a conceptual diagram for describing a human body surface applied in the measurement system according to the first example embodiment.

FIG. 5 is a conceptual diagram for describing a surface (also referred to as a human body surface) set for the human body. In the present example embodiment, a sagittal plane dividing the body into left and right, a coronal plane dividing the body into front and rear, and a horizontal plane dividing the body horizontally are defined. In the upright state as in FIG. 5, the world coordinate system and the local coordinate system match. In the present example embodiment, rotation in the sagittal plane with the x-axis as the rotation axis is defined as roll, rotation in the coronal plane with the y-axis as the rotation axis is defined as pitch, and rotation in the horizontal plane with the z-axis as the rotation axis is defined as yaw. In addition, a rotation angle in the sagittal plane with the x axis as a rotation axis is defined as a roll angle, a rotation angle in the coronal plane with the y axis as a rotation axis is defined as a pitch angle, and a rotation angle in the horizontal plane with the z axis as a rotation axis is defined as a yaw angle. In the present example embodiment, when the body is viewed from the right side, clockwise rotation in the sagittal plane is defined as positive, and counterclockwise rotation in the sagittal plane is defined as negative.

Figure 6:
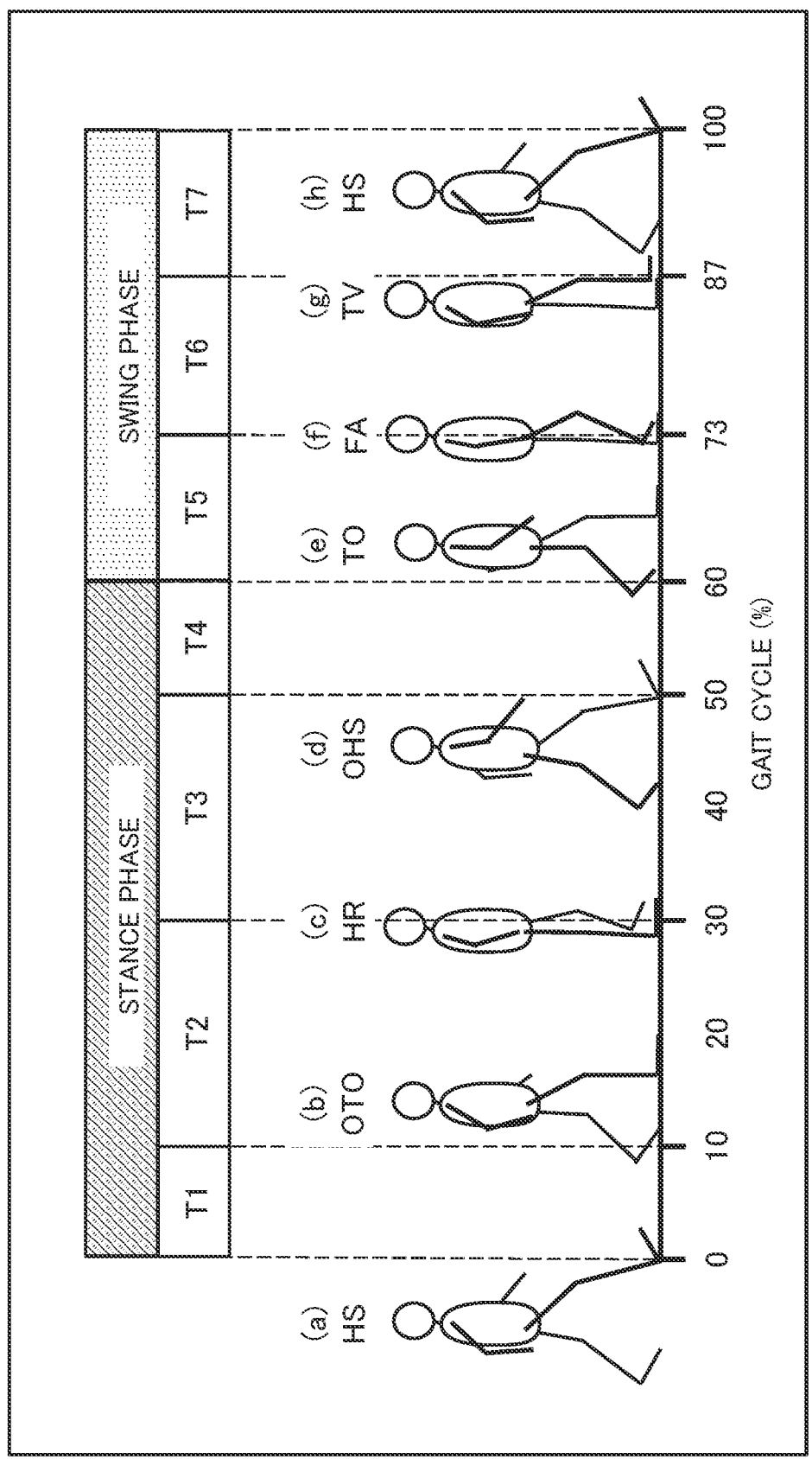
FIG. 6 is conceptual diagram for describing one gait cycle with a right foot as a reference.

FIG. 6 is a conceptual diagram for describing one gait cycle with a right foot as a reference. One gait cycle based on the left foot is also similar to that of the right foot. The horizontal axis of FIG. 6 is a gait cycle normalized by setting one gait cycle of the right foot as 100%, with a time point at which a heel of the right foot lands on the ground as a start point and then a time point at which the heel of the right foot next lands on the ground as an end point. The one gait cycle of one foot is roughly divided into a stance phase in which at least a part of the back side of the foot is in contact with the ground and a swing phase in which the back side of the foot is separated from the ground. The stance phase is further subdivided into a loading response stage T1, a midstance stage T2, a terminal stance stage T3, and a pre-swing stage T4. The swing phase is further subdivided into an initial swing stage T5, a midswing stage T6, and a terminal swing stage T7.

In the gait cycle, a plurality of events (also referred to as gait events) are detected. Situation (a) in FIG. 6 illustrates an event (heel strike (HS)) in which the heel of the right foot is grounded. Situation (b) in FIG. 6 illustrates an event (opposite toe off (OTO)) in which a toe of the left foot moves away from the ground while a sole of the right foot is grounded. Situation (c) in FIG. 6 illustrates an event (heel rise (HR)) in which the heel of the right foot is lifted while the sole of the right foot is grounded. Situation (d) in FIG. 6 illustrates an event (opposite heel strike (OHS)) in which the heel of the left foot is grounded. Situation (e) in FIG. 6 illustrates an event (toe off (TO)) in which the toe of the right foot is separated from the ground while the sole of the left foot is grounded. Situation (f) in FIG. 6 illustrates an event (foot adjacent (FA)) in which the left foot and the right foot are adjacent while the sole of the left foot is grounded. Situation (g) in FIG. 6 illustrates an event (tibia vertical (TV)) in which a tibia of the right foot is substantially perpendicular to the ground while the sole of the left foot is grounded. Situation (h) in FIG. 6 illustrates an event (heel strike (HS)) in which the heel of the right foot is grounded. Situation (h) in FIG. 6 is relevant to an end point of the gait cycle starting from Situation (a) in FIG. 6 and is relevant to a start point of the next gait cycle.

In the present example embodiment, the step width is measured at the timing when both feet are adjacent in the lateral direction. When expressed as a gait cycle, the timing at which both feet are adjacent in the lateral direction is relevant to the timing between the midstance stage T2 and the terminal stance stage T3 and the timing in the middle of the mid swing stage T6. In addition, when expressed as a gait event, the timing at which both feet are adjacent in the lateral direction is relevant to the timing of the heel rise or the timing of the foot adjacent.

For example, the timing at which both feet are adjacent in the lateral direction is detected from the time series data (gait waveform) of the parameters related to the spatial acceleration or the spatial angular velocity included in the sensor data acquired by the data acquisition device 12. For example, the step width may be measured at the timing of the gait event such as the heel rise or the foot adjacent detected from the gait waveform. For example, the heel rise is detected as a timing of an acceleration inflection point between the opposite toe off and the opposite foot heel strike in the gait waveform of the roll angular velocity. For example, the foot adjacent is detected as a timing of a local minimum peak of a traveling direction acceleration (Y-direction acceleration) between the toe off and the tibia vertical. A center timing of the timing of the heel strike and the timing of the toe off may be detected as the timing at which both feet are adjacent in the lateral direction. A distance between both feet is minimized at the timing when both feet are adjacent in the lateral direction. Therefore, the time at which the propagation time of the ultrasonic wave is minimized may be detected as the timing at which both feet are adjacent in the lateral direction.

The step width measurement device 15 is mounted on a server or a mobile terminal. For example, the step width measurement device 15 measures the step width of the user by using the sensor data and the propagation data acquired from the data acquisition device 12. For example, the step width measurement device 15 measures the step width of the user by using sensor data acquired from the data acquisition device 12 mounted on one foot (first foot) and propagation data acquired from the data acquisition device 12 mounted on the other foot (second foot). When the first foot is the right foot, the second foot is the left foot. When the first foot is the left foot, the second foot is the right foot.

The step width measurement device 15 calculates a value obtained by second-order integration of a height direction acceleration (Z-direction acceleration) included in the sensor data with respect to the measurement time of the step width as the height (Z-direction height) of the data acquisition device 12. Furthermore, regarding the measurement time (also referred to as first time) of the step width, the step width measurement device 15 calculates the interval between the left and right feet using the transmission time of the transmitted ultrasonic wave included in the propagation data and the reception time of the reflected wave of the transmitted ultrasonic wave. The first time is relevant to a timing at which both feet are adjacent in the lateral direction. For example, the step width measurement device 15 controls the data acquisition device 12 in such a way that the transmitted ultrasonic wave is transmitted from the ultrasonic transmitter 111 at the first time. In this case, the time (also referred to as transmission time) at which the transmitted ultrasonic wave is transmitted from the ultrasonic transmitter 111 is relevant to the first time. With respect to the measurement time (first time) of the step width, the step width measurement device 15 calculates the step width by using the height (also referred to as a sensor height) of the data acquisition device 12 and the interval between the left and right feet (also referred to as a distance between both feet) on a principle of triangulation. Details of a step width measurement method by the step width measurement device 15 will be described later.

The step width measurement device 15 outputs data (also referred to as step width data) including a measurement result of the step width. For example, the step width measurement device 15 outputs the step width data at the measurement time (first time) of the step width. For example, the step width measurement device 15 outputs the time series data of the step width data in the period including the measurement time (first time) of the step width. For example, the step width measurement device 15 outputs step width data to a host system (not illustrated). The host system performs optional processing using the acquired step width data. For example, the step width measurement device 15 outputs the step width data to a display device (not illustrated). The display device displays information relevant to the acquired step width data on a screen.

[Data Acquisition Device]

Figure 7:
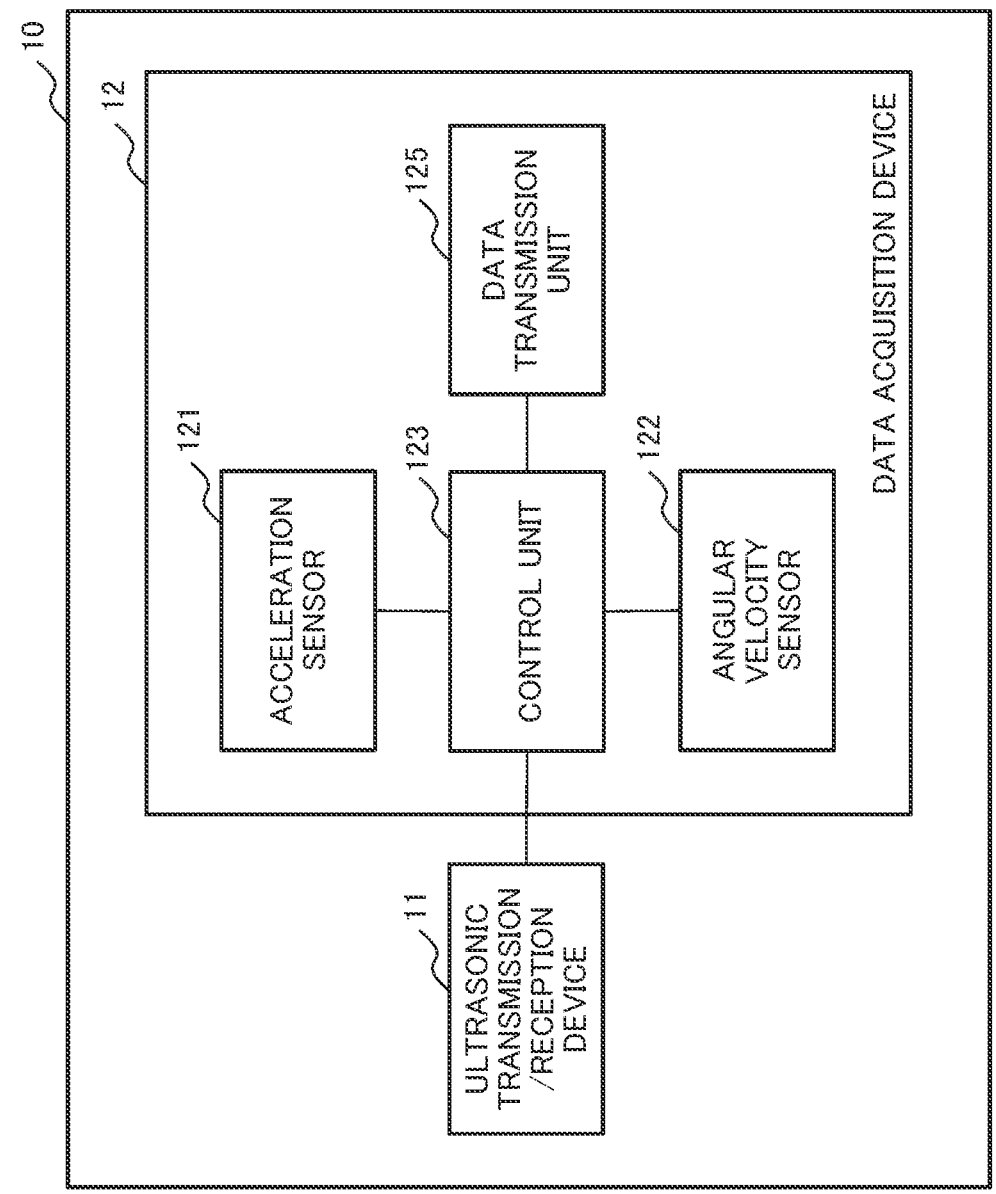
FIG. 7 is a block diagram illustrating an example of a configuration of a data acquisition device and the like of the measurement system according to the first example embodiment.

Next, a detailed configuration of the data acquisition device 12 will be described. FIG. 7 is a block diagram illustrating an example of a detailed configuration of the data acquisition device 12. The data acquisition device 12 includes an acceleration sensor 121, an angular velocity sensor 122, a control unit 123, and a data transmission unit 125. In addition, the data acquisition device 12 includes a power supply and a clock (not illustrated). In the following description, each of the acceleration sensor 121, the angular velocity sensor 122, the control unit 123, and the data transmission unit 125 will be described as an operation subject, but the data acquisition device 12 may be regarded as an operation subject.

The acceleration sensor 121 is a sensor that measures accelerations (also referred to as spatial accelerations) in a three-axis direction. The acceleration sensor 121 outputs the measured acceleration to the control unit 123. For example, a sensor of a piezoelectric type, a piezoresistive type, a capacitance type, or the like can be used as the acceleration sensor 121. The sensor used for the acceleration sensor 121 is not limited to the measurement method as long as the sensor can measure acceleration.

The angular velocity sensor 122 is a sensor that measures angular velocities (also referred to as spatial angular velocities) in the three-axis direction. The angular velocity sensor 122 outputs the measured angular velocity to the control unit 123. For example, a sensor of a vibration type, a capacitance type, or the like can be used as the angular velocity sensor 122. The sensor used for the angular velocity sensor 122 is not limited to the measurement method as long as the sensor can measure the angular velocity.

The spatial acceleration measured by the acceleration sensor 121 or the spatial angular velocity measured by the angular velocity sensor 122 is used for measuring various gait parameters. For example, the spatial acceleration or the spatial angular velocity are used for measuring gait parameters such as a gait speed, a stride length, a grounding angle, a separation angle, a foot-raising height, a division, and a toe angle.

The control unit 123 performs overall control and data processing of the ultrasonic transmission/reception device 11 and the data acquisition device 12, and for example, the control unit 123 is achieved by a microcomputer or a microcontroller. For example, the control unit 123 includes a central processing unit (CPU), a random access memory (RAM), a read only memory (ROM), a flash memory, or the like.

The control unit 123 acquires each of the three-axis acceleration and the three-axis angular velocity from each of the acceleration sensor 121 and the angular velocity sensor 122. The control unit 123 performs analog-to-digital conversion (AD conversion) on the acquired physical quantities (analog data) such as acceleration or angular velocity. The physical quantities (analog data) measured by the acceleration sensor 121 and the angular velocity sensor 122 may be converted into digital data in each of the acceleration sensor 121 and the angular velocity sensor 122. The control unit 123 outputs the converted digital data (also referred to as sensor data) to the data transmission unit 125. The control unit 123 may output the sensor data to the data transmission unit 125 in real time, or may collectively output the sensor data temporarily stored in a flash memory or the like to the data transmission unit 125. The sensor data includes at least acceleration data converted into digital data and angular velocity data converted into digital data. The acceleration data includes acceleration vectors in the three-axis direction. The angular velocity data includes angular velocity vectors around three axes. Acquisition times of the acceleration data and the angular velocity data are associated with the acceleration data and the angular velocity data. In addition, the control unit 123 may be configured to output sensor data obtained by adding correction such as a mounting error, temperature correction, and linearity correction to the acquired acceleration data and angular velocity data. In addition, the control unit 123 may generate angle data around three axes using the acquired acceleration data and angular velocity data.

The timing at which the control unit 123 generates the sensor data is optionally set. For example, when detecting the walking of the user wearing the data acquisition device 12, the control unit 123 starts generating sensor data based on the movement of the foot of the user. For example, when starting to generate sensor data, the control unit 123 continues to generate sensor data for a predetermined period set in advance. For example, the control unit 123 measures sensor data at intervals of 10 milliseconds. For example, when detecting the stop of walking, the control unit 123 ends the generation of the sensor data.

In addition, the control unit 123 drives and controls the ultrasonic transmitter 111 to transmit the transmitted ultrasonic wave from the ultrasonic transmitter 111. The control unit 123 outputs a transmission pulse for setting a pulse width of the transmitted ultrasonic wave to the ultrasonic transmitter 111. The ultrasonic transmitter 111 transmits the transmitted ultrasonic wave relevant to the transmission pulse output from the control unit 123 under the control of the control unit 123. The control unit 123 acquires an electric signal based on the reflected wave of the transmitted ultrasonic wave from the ultrasonic receiver 112. The transmitted ultrasonic waves spread radially in the air or are absorbed by the air, and as a result, signal intensity attenuates according to a propagation distance in the air. Therefore, the control unit 123 amplifies the electric signal based on the reflected wave. The control unit 123 detects a peak from the amplified electric signal and specifies the time of the detected peak.

The control unit 123 calculates a time difference (also referred to as propagation time) between the transmission time of the transmitted ultrasonic wave and the reception time of the reflected wave of the transmitted ultrasonic wave for each pulse included in the transmission pulse. The control unit 123 outputs, to the data transmission unit 125, data (also referred to as propagation data) in which the calculated propagation time is associated with the first time related to the transmission time and the reception time used to calculate the propagation time. The control unit 123 may generate, as propagation data, data including the transmission time of the transmitted ultrasonic wave and the reception time of the reflected wave of the transmitted ultrasonic wave. For example, the control unit 123 generates propagation data in which transmission times of a plurality of ultrasonic waves constituting the transmitted ultrasonic wave relevant to the transmission pulse are associated with reception times of a plurality of ultrasonic waves constituting the transmission pulse. In addition, the control unit 123 may generate, as propagation data, data in which the time series data of the transmitted ultrasonic wave relevant to the transmission pulse is associated with the time series data related to the reflected wave of the transmitted ultrasonic wave. In addition, the control unit 123 may generate, as the propagation data, data in which a value obtained by converting a propagation time into a distance is associated with the first time related to the transmission time and the reception time used for calculation of the propagation time. A method of converting a propagation time into a distance will be described later.

For example, the control unit 123 activates a timer module (not illustrated) at the time of transmitting the transmitted ultrasonic wave relevant to the transmission pulse, and captures a timer value at the time of detecting the reflected wave of the transmitted ultrasonic wave. The timer value captured at this time is relevant to the propagation time of the transmitted ultrasonic wave. For example, the control unit 123 measures generation of a high-frequency drive signal relevant to a transmission pulse, setting of a drive period, and a delay time until the reflected wave of the transmitted ultrasonic wave is received. In response to the high-frequency drive signal generated by the control unit 123, the ultrasonic transmitter 111 transmits a transmitted ultrasonic wave of high-frequency continuous pulses. Among the transmitted ultrasonic waves transmitted from the ultrasonic transmitter 111, a part of a reflected wave reflected by an object having a higher density than air is received by the ultrasonic receiver 112. In the present example embodiment, an opposite foot of a foot on which the ultrasonic transmitter 111 as a transmission source of the transmitted ultrasonic wave is mounted is assumed as an object having a higher density than air. An electric signal (also referred to as a reception signal) based on the reflected wave of the transmitted ultrasonic wave is amplified in order to improve detection accuracy. For example, the control unit 123 detects a peak relevant to the transmission pulse from the amplified reception signal and measures a round-trip time for each pulse of the transmitted ultrasonic wave. For example, the control unit 123 may convert the round-trip time for each pulse of the transmitted ultrasonic wave into the distance based on the sound speed in the air.

Figure 8:
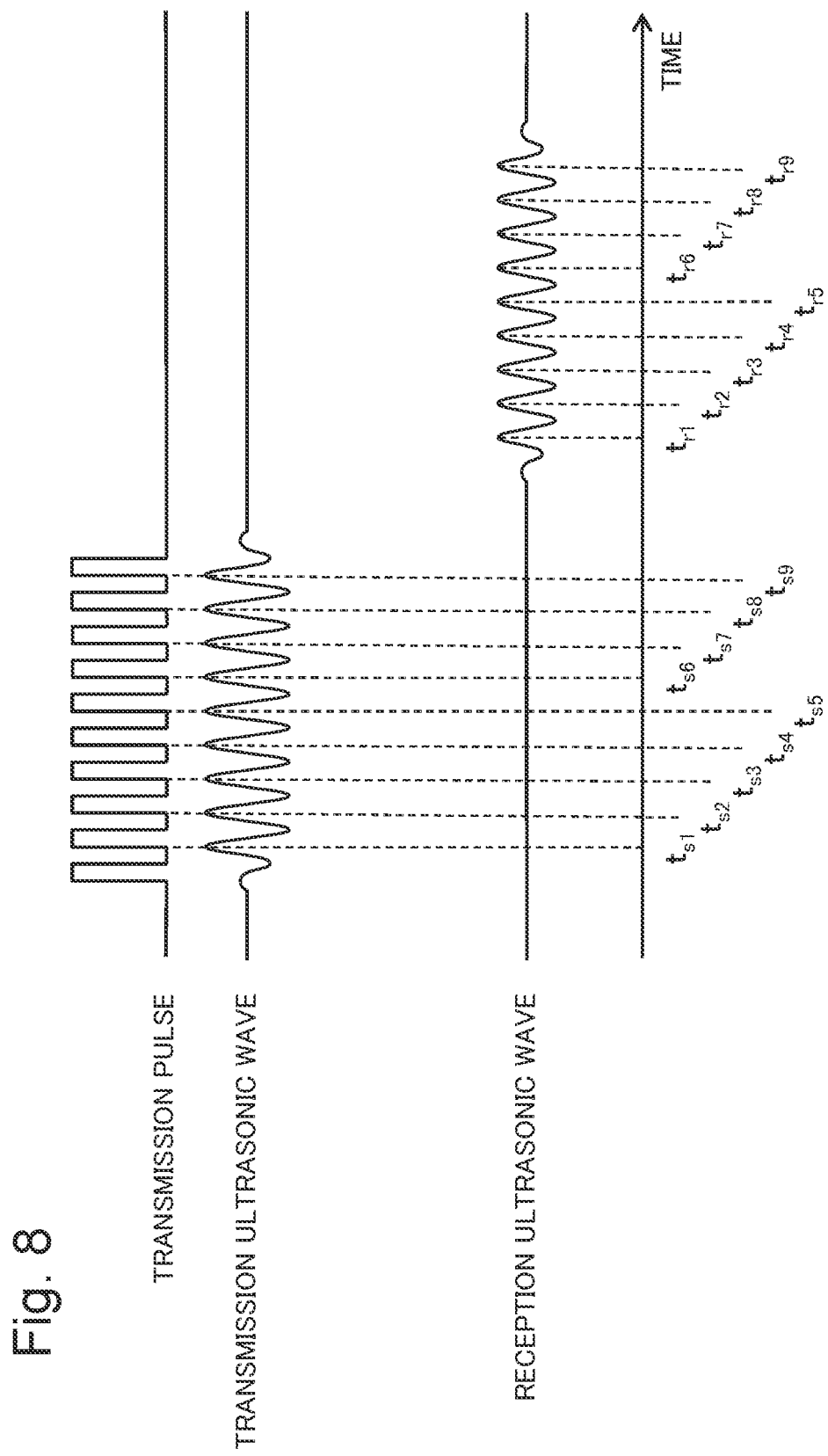
FIG. 8 is a conceptual diagram for describing an example of a pattern of an ultrasonic wave transmitted/received from the ultrasonic transmission/reception device of the measurement system according to the first example embodiment.

FIG. 8 is a conceptual diagram for describing an example of transmission timings of transmitted ultrasonic waves relevant to transmission pulses generated by the control unit 123 and reception timings of the reflected waves (also referred to as reception ultrasonic waves) of the transmitted ultrasonic waves. FIG. 8 illustrates an example of transmitting a transmitted ultrasonic wave including a plurality of pulses. Hereinafter, an i-th pulse constituting the transmitted ultrasonic wave is referred to as a transmission ultrasonic pulse i (i is a natural number). In addition, in the following description, the pulse of the reception ultrasonic wave relevant to the transmission ultrasonic pulse i is referred to as a reception ultrasonic pulse i. In the case of the example of FIG. 8, the transmission ultrasonic wave includes a transmission ultrasonic pulse 1, a transmission ultrasonic pulse 2, . . . , and a transmission ultrasonic pulse 9. In addition, in the case of the example of FIG. 8, the received ultrasonic wave includes the received ultrasonic pulse 1, the received ultrasonic pulses 2, . . . , and the received ultrasonic pulse 9.

As shown in the following Equation 1, a difference between a reception time $t_{ri}$ of the reception ultrasonic pulse i relevant to the transmission ultrasonic pulse i and a transmission time $t_{si}$ of the transmission ultrasonic pulse i is relevant to a propagation time $T_i$ of the transmission ultrasonic pulse i.

$$T_i = t_{ri} - t_{si} \quad (1)$$

The propagation time $T_i$ is relevant to a round-trip time from the transmission of the transmission ultrasonic pulse i to the return of the reception ultrasonic pulse i relevant to the transmission ultrasonic pulse i.

When a sound velocity is denoted by $v_s$, a distance $L_i$ between the left and right feet at the timing when the transmission ultrasonic pulse i is transmitted is calculated using the following Equation 2.

$$D_i = (v_s T_i)/2 \quad (2)$$

However, in Equation 2 described above, an average distance $L_i$ between the left and right feet between the transmission time of the transmission ultrasonic pulse i and the reception time of the reception ultrasonic pulse i relevant to the transmission ultrasonic pulse i is calculated. In Equation 2, a value of a sound velocity v may be adjusted according to temperature, humidity, and the like.

Figure 9:
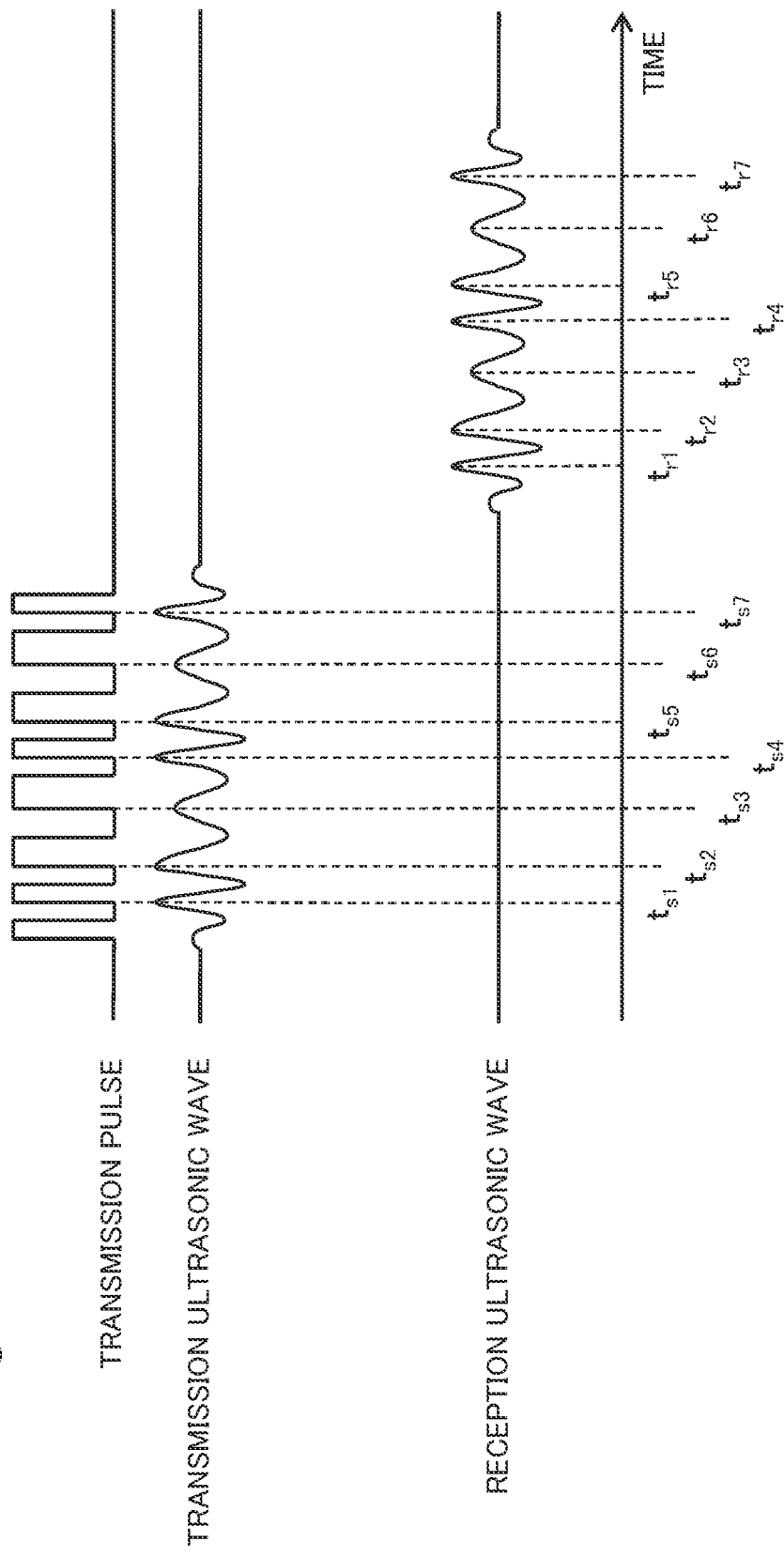
FIG. 9 is a conceptual diagram for describing an example of a pattern of an ultrasonic wave transmitted/received from the ultrasonic transmission/reception device of the measurement system according to the first example embodiment.

FIG. 9 is a conceptual diagram for describing another example of transmission timings of transmitted ultrasonic waves relevant to transmission pulses generated by the control unit 123 and reception timings of the reflected waves (also referred to as reception ultrasonic waves) of the transmitted ultrasonic waves. In the example of FIG. 9, the control unit 123 transmits a transmitted ultrasonic wave relevant to a modulated transmission pulse. In a case where the transmission pulses are at equal intervals, there is a possibility that the transmitted ultrasonic wave and the reception ultrasonic wave to be processed deviate from each other. When the transmission pulse is modulated as illustrated in FIG. 9, the transmitted ultrasonic wave based on the transmission pulse and the reflected wave of the transmitted ultrasonic wave are easily associated with each other according to the modulation pattern in such a way that the possibility of erroneous detection is reduced.

The timing at which the control unit 123 generates the propagation data is optionally set. For example, when detecting the walking of the user wearing the data acquisition device 12, the control unit 123 starts generating propagation data based on the movement of the foot of the user. For example, when starting to generate propagation data, the control unit 123 continues to generate propagation data for a predetermined period set in advance. For example, when starting to generate the propagation data, the control unit 123 transmits a transmission ultrasonic wave composed of continuous pulses at a predetermined time interval for a predetermined time. For example, the control unit 123 transmits the transmitted ultrasonic wave in response to an instruction from the step width measurement device 15. For example, the control unit 123 transmits the transmitted ultrasonic wave in the period of the stance phase detected based on the sensor data. For example, the control unit 123 stops the transmitted ultrasonic wave in the period of the swing phase detected based on the sensor data. For example, when detecting the stop of walking, the control unit 123 ends the generation of the propagation data.

The data transmission unit 125 acquires the sensor data and the propagation data from the control unit 123. The data transmission unit 125 transmits the acquired sensor data and propagation data to the step width measurement device 15. For example, the data transmission unit 125 transmits the sensor data and the propagation data to the step width measurement device 15 via wireless communication. For example, the data transmission unit 125 is configured to transmit the sensor data and the propagation data to the step width measurement device 15 via a wireless communicator capability (not illustrated) conforming to a standard such as Bluetooth (registered trademark) or WiFi (registered trademark). The communicator capability of the data transmission unit 125 may conform to a standard other than Bluetooth (registered trademark) or WiFi (registered trademark). For example, the data transmission unit 125 may transmit the sensor data and the propagation data to the step width measurement device 15 via a wire such as a cable. The data transmission unit 125 transmits the sensor data to the step width measurement device 15 at an optional timing. For example, every time the sensor data is generated, the data transmission unit 125 transmits the sensor data to the step width measurement device 15. For example, the data transmission unit 125 collectively transmits the sensor data for a certain period to the step width measurement device 15. For example, the data transmission unit 125 collectively transmits sensor data for single stride to the step width measurement device 15.

[Step Width Measurement Device]

Figure 10:
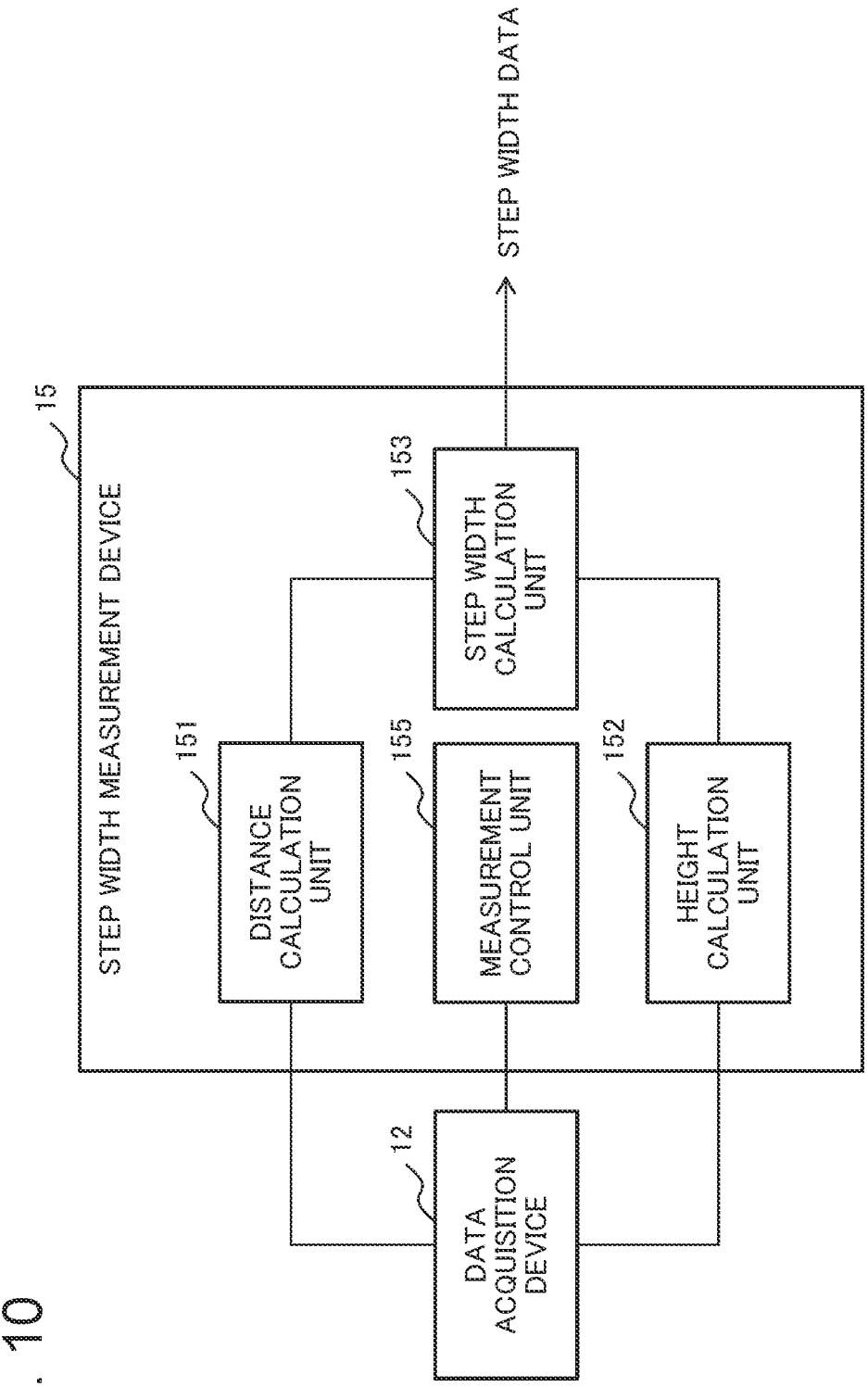
FIG. 10 is a block diagram illustrating an example of a configuration of a step width measurement device and the like of the measurement system according to the first example embodiment.

Next, a detailed configuration of the step width measurement device 15 will be described with reference to the drawings. FIG. 10 is a block diagram illustrating an example of a detailed configuration of the step width measurement device 15. The step width measurement device 15 includes a distance calculation unit 151, a height calculation unit 152, a step width calculation unit 153, and a measurement control unit 155. In the configuration of FIG. 10, an acquisition unit that acquires propagation data and sensor data and an output unit that outputs step width data are omitted.

The distance calculation unit 151 acquires the propagation data from the data acquisition device 12 mounted on one foot. Using the acquired propagation data, the distance calculation unit 151 calculates the distance between the left and right feet (distance L between both feet) at the time associated with the propagation data. For example, the distance calculation unit 151 calculates the distance L between both feet using the reflected wave received at the earliest time or the reflected wave having the largest intensity. The timing at which the intensity of the reflected wave is maximized is relevant to the timing of foot adjacent at which the positions of both feet in a traveling direction (Y direction) coincide with each other. The distance calculation unit 151 outputs the calculated value of the distance L between both feet to the step width calculation unit 153. In a case where the distance L between both feet is included in the propagation data, the distance calculation unit 151 outputs the value of the distance L between both feet to the step width calculation unit 153.

The height calculation unit 152 acquires sensor data, which is measured at the transmission time of the transmitted ultrasonic wave included in the propagation data acquired from the data acquisition device 12 mounted on one foot, from the data acquisition device 12 mounted on the other foot. The height calculation unit 152 calculates the height (sensor height H) of the foot using the sensor data acquired from the data acquisition device 12 mounted on the other foot. For example, the height calculation unit 152 calculates the height calculated based on the sensor data acquired from the data acquisition device 12 mounted on the other foot as the height (sensor height H) of the other foot. The height of the data acquisition device 12 measured based on the sensor data can be calculated by performing second-order integration on the height direction acceleration (Z-direction acceleration) included in the sensor data. It is assumed that the height (sensor height H) of the data acquisition device 12 coincides with the height of the ultrasonic transmission/reception device 11. In the case of using software that outputs the value (sensor height H) of the height of the data acquisition device 12 using the sensor data, the height (sensor height H) of the data acquisition device 12 output by the software may be used. The height calculation unit 152 outputs the calculated value of the sensor height H to the step width calculation unit 153.

The step width calculation unit 153 acquires the distance L between both feet at the measurement time (first time) of the step width from the distance calculation unit 151. Furthermore, the step width calculation unit 153 acquires the sensor height H at the measurement time (first time) of the step width from the height calculation unit 152. The step width calculation unit 153 calculates the step width D by using the distance L between both feet and the sensor height H at the measurement time (first time) of the step width.

The measurement control unit 155 controls the data acquisition device 12 in order to measure the sensor data and the propagation data. For example, the measurement control unit 155 outputs a measurement instruction of the sensor data and the propagation data to the data acquisition device 12 at a measurement timing of the sensor data and the propagation data. For example, when detecting walking of the user equipped with the data acquisition device 12, the measurement control unit 155 outputs an instruction to generate the sensor data and the propagation data to the data acquisition device 12. For example, when walking is detected by a sensor of a mobile terminal carried by the user, the measurement control unit 155 outputs an instruction to generate the sensor data and the propagation data to the data acquisition device 12. For example, in a case where the data acquisition device 12 can detect the walking of the user, the timing at which the walking of the user is detected may be set as the generation timing of the sensor data and the propagation data in such a way that the measurement instruction by the measurement control unit 155 can be omitted.

For example, the measurement control unit 155 controls the data acquisition device 12 to measure the propagation data according to the gait event detected from the gait waveform based on the sensor data. For example, when the gait event such as the heel rise or the foot adjacent is detected from the gait waveform based on the sensor data, the measurement control unit 155 controls the data acquisition device 12 to measure the propagation data. Upon receiving the sensor data from the data acquisition device 12, the measurement control unit 155 detects a gait event from a gait waveform based on the received sensor data.

For example, when detecting the stance phase using the gait waveform of one foot, the measurement control unit 155 outputs a transmission instruction of the transmitted ultrasonic wave to the data acquisition device 12 mounted on the foot in which the stance phase is detected. For example, the measurement control unit 155 detects the stance phase based on the timing of the heel strike detected using the gait waveform of the traveling direction acceleration (Y-direction acceleration) or the height direction acceleration (Z-direction acceleration). For example, the measurement control unit 155 detects, as the timing of the heel strike, the timing of the midpoint between the timing at which the maximum peak is detected and the timing at which the minimum peak appearing next to the maximum peak is detected, in the gait waveform of the traveling direction acceleration for one gait cycle. For example, the measurement control unit 155 may detect the stance phase based on a gait event such as heel rise, an opposite toe off, or an opposite heel strike included in the stance phase. For example, the measurement control unit 155 detects a gait event such as a heel rise, an opposite toe off, or an opposite heel strike by using a gait waveform such as a roll angular velocity.

When receiving the propagation data from the data acquisition device 12, the measurement control unit 155 causes the distance calculation unit 151, the height calculation unit 152, and the step width calculation unit 153 to execute the step width calculation processing. The distance calculation unit 151, the height calculation unit 152, and the step width calculation unit 153 execute the step width calculation processing in accordance with an instruction from the measurement control unit 155.

For example, when detecting the swing phase from the gait waveform of one foot, the measurement control unit 155 outputs an instruction to stop the transmission of the ultrasonic wave to the data acquisition device 12 mounted on the foot in which the swing phase is detected. For example, the measurement control unit 155 detects the swing phase based on the timing of the toe off detected using the gait waveform of the traveling direction acceleration (Y-direction acceleration). For example, the measurement control unit 155 detects the timing at which the maximum peak is detected between two valleys included in the minimum peak as the timing of the toe off, in the gait waveform of the traveling direction acceleration for one gait cycle. For example, the measurement control unit 155 may detect the swing phase based on a gait event such as foot adjacent or tibia vertical included in the swing phase. For example, the measurement control unit 155 detects a gait event such as a heel rise, an opposite toe off, or an opposite heel strike by using a gait waveform such as a roll angular velocity. For example, the measurement control unit 155 detects a gait event such as foot adjacent or tibia vertical using a gait waveform such as the traveling direction acceleration (Y-direction acceleration) or the height direction acceleration (Z-direction acceleration).

Figure 11:
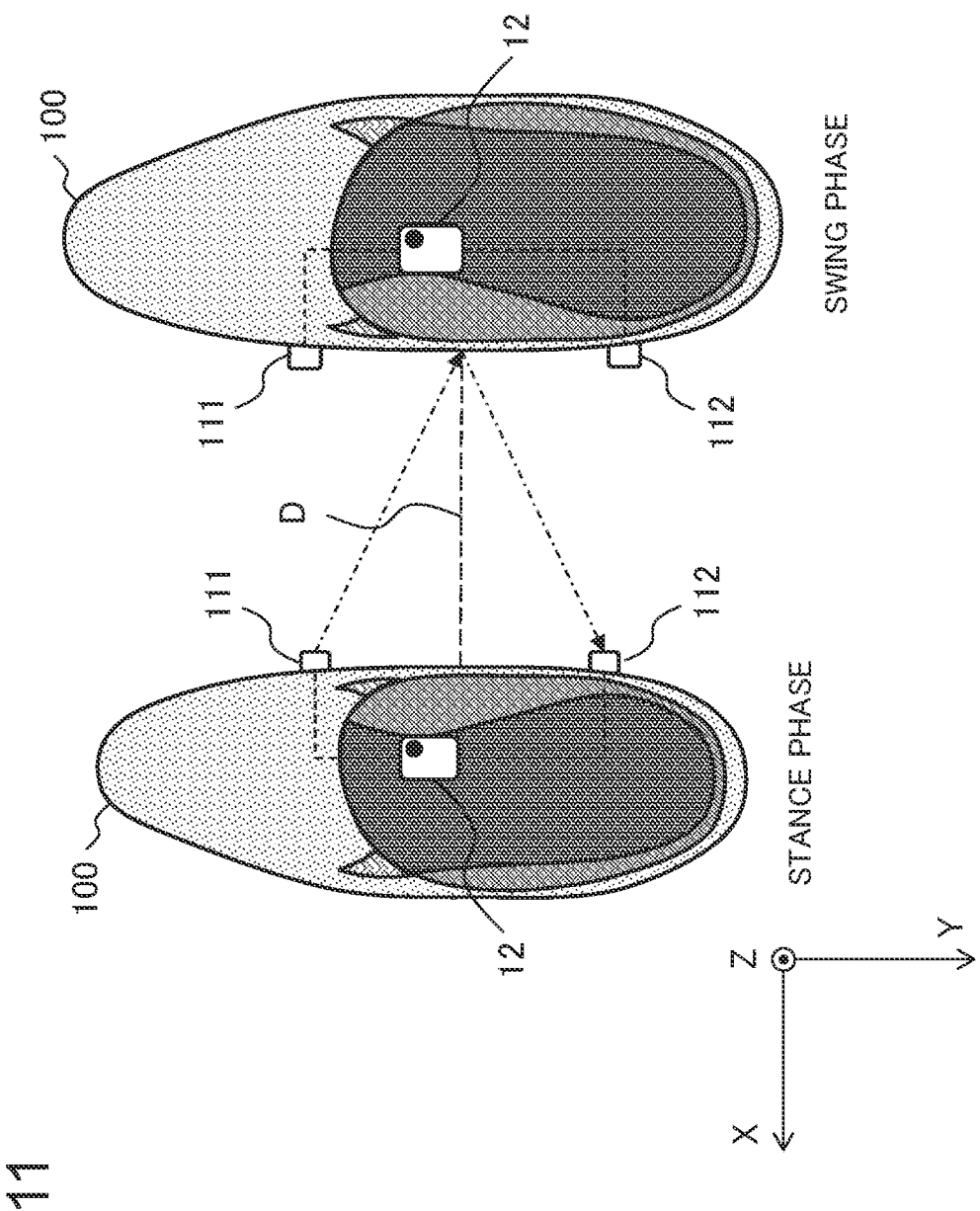
FIG. 11 is a conceptual diagram (top view) for describing a method of calculating a step width by the step width measurement device of the measurement system according to the first example embodiment.
Figure 12:
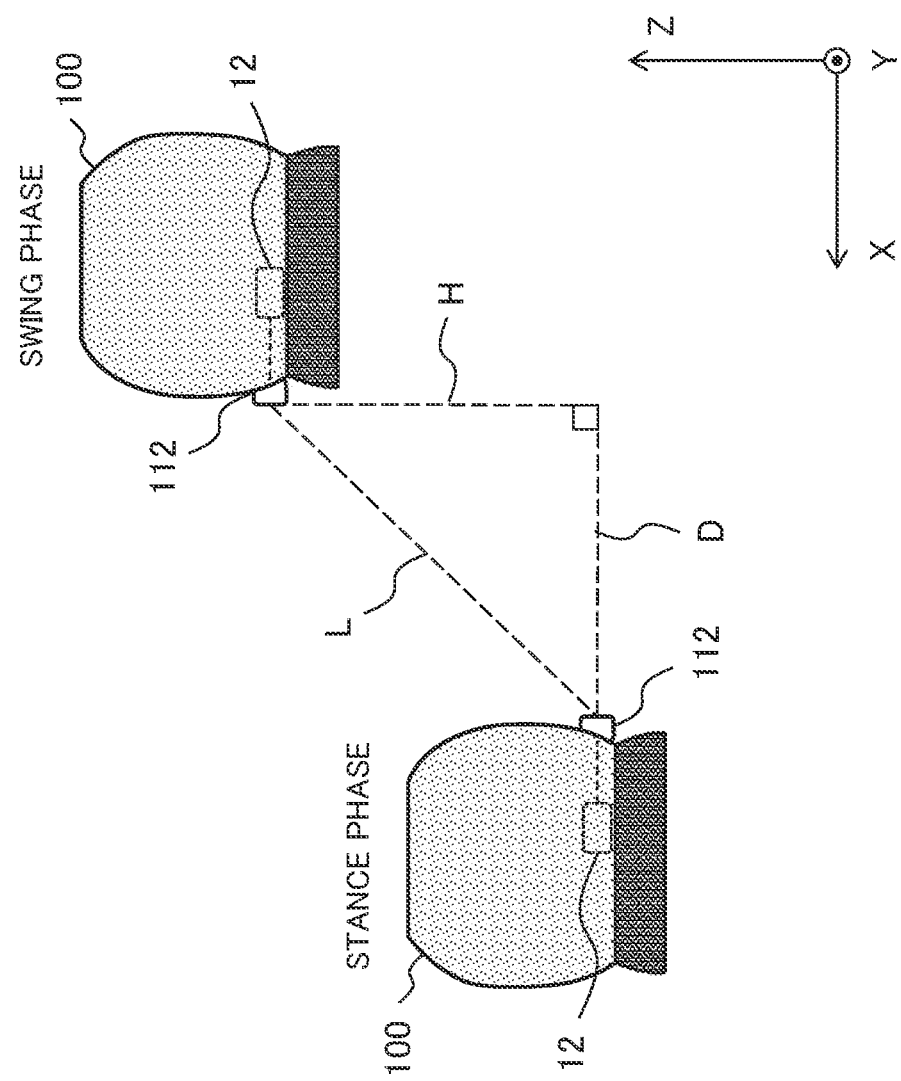
FIG. 12 is a conceptual diagram (rear view) for describing the method of calculating a step width by the step width measurement device of the measurement system according to the first example embodiment.

FIGS. 11 and 12 are conceptual diagrams for describing a method of calculating the step width D. FIG. 11 is a top view of the shoes 100 of both feet as viewed from above at the timing when the left foot is in the stance phase and the right foot is in the swing phase. FIG. 12 is a rear view of the shoes 100 of both feet as viewed from the rear at the same timing as FIG. 11. FIGS. 11 and 12 illustrate the position of the shoe 100 at the timing (the timing of the foot adjacent) when the traveling direction positions (Y-direction positions) of the toes and the heels of both feet become the same. However, it is assumed that the sole of the foot in the swing phase is parallel to the ground at the timing of the foot adjacent. The step width D is relevant to a distance in the lateral direction (X direction) between the inner side surfaces of both feet. It is assumed that the transmission unit of the ultrasonic transmitter 111 and the side surface of the foot coincide with each other.

The step width calculation unit 153 calculates the step width D based on the principle of triangulation by using the distance L between both feet and the sensor height H at the measurement time (first time) of the step width. For example, in a case where the coordinates of both feet in the traveling direction (Y direction) coincide with each other, the step width calculation unit 153 calculates the step width D by using the following Equation 3.

$$D=\sqrt{L^2-H^2} \quad (3)$$

When the position coordinates of both feet in the traveling direction (Y direction) do not coincide with each other, the step width D may be calculated using the position coordinates of both feet in the lateral direction (X direction).

For example, in a case where the interval between the central axes of the left and right feet is defined as the step width D, a value obtained by adding the distance between the central axes of the left and right feet and the inner side surface of the foot to the distance between the inner side surfaces of the left and right feet may be set as the step width D. In a case where the central axis of the foot is not parallel to the Y axis, the interval between parts such as the toe, the heel, and the arch of the left and right feet may be defined as the step width D.

The step width calculation unit 153 outputs data (also referred to as step width data) including the calculated step width D. For example, the step width calculation unit 153 outputs the step width data at the time (first time) of the measurement target of the step width. For example, the step width calculation unit 153 outputs the time series data of the step width data in the period of the step width measurement target. For example, the step width calculation unit 153 outputs the step width data to the host system (not illustrated). The host system performs optional processing using the acquired step width data. For example, the step width calculation unit 153 outputs the step width data to the display device (not illustrated). The display device (not illustrated) displays information relevant to the acquired step width data on a screen.

Figure 13:
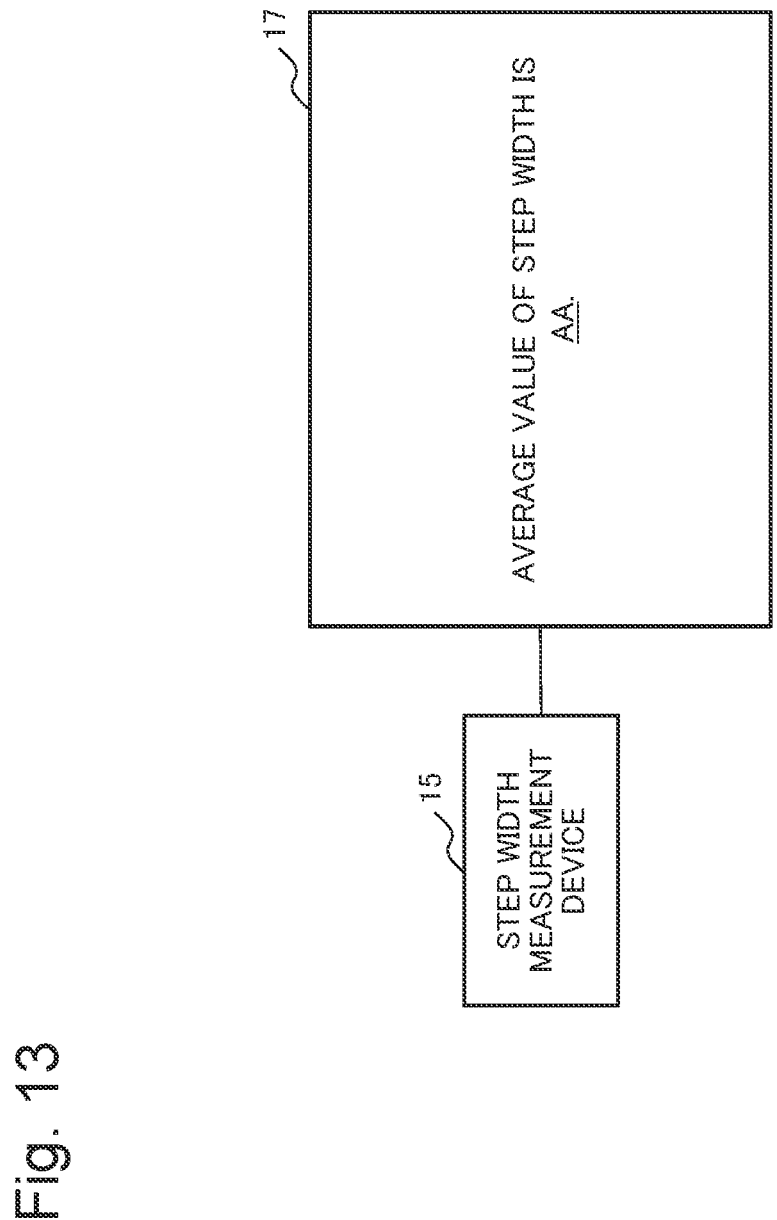
FIG. 13 is a conceptual diagram for describing a display example of information related to a step width measured by the step width measurement device of the measurement system according to the first example embodiment.

FIG. 13 is a conceptual diagram illustrating an example in which information related to the step width data output from the step width calculation unit 153 is displayed on the screen of the display device 17. FIG. 13 is an example in which the value of the step included in the step width data is displayed on the screen of the display device 17. In the example of FIG. 13, information "step width is AA." is displayed on the screen of the display device 17. For example, when the trajectory of the step width is generated, the step width in the horizontal plane during walking can be verified. For example, the trajectory of the step width can be used for gait training of a fashion model, analysis of an aging tendency of a foot, determination of recovery from injury or illness, and the like.

(Operation)

Next, an operation of the measurement system 1 according to the present example embodiment will be described with reference to the drawings. Hereinafter, each operation of the ultrasonic transmission/reception device 11, the data acquisition device 12, and the step width measurement device 15 included in the measurement system 1 will be individually described.

[Ultrasonic Transmission/Reception Device]

Figure 14:
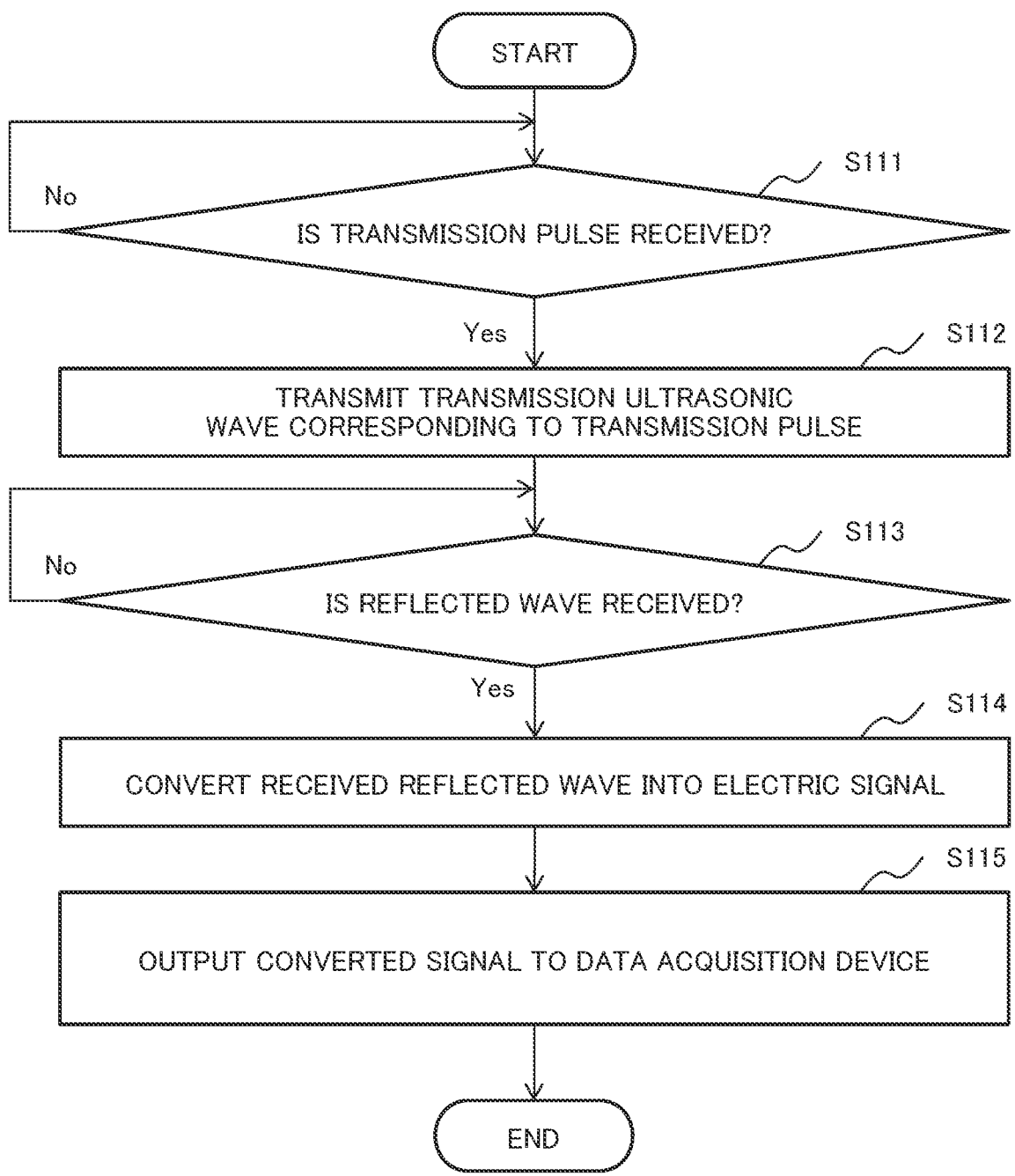
FIG. 14 is a flowchart for describing an example of an operation of the ultrasonic transmission/reception device of the measurement system according to the first example embodiment.

First, an example of the operation of the ultrasonic transmission/reception device 11 will be described. FIG. 14 is a flowchart for describing an example of the operation of the ultrasonic transmission/reception device 11. The processing along the flowchart of FIG. 14 relates to the processing of the ultrasonic transmission/reception device 11 in the period of the stance phase.

In FIG. 14, when the transmission pulse is received (Yes in step S111), the ultrasonic transmission/reception device 11 transmits the transmitted ultrasonic wave relevant to the transmission pulse from the ultrasonic transmitter 111 (step S112). When the transmission pulse is not received (No in step S111), the ultrasonic transmission/reception device 11 waits until the transmission pulse is received.

After step S111, when the ultrasonic receiver 112 receives the reflected wave of the transmitted ultrasonic wave (Yes in step S113), the ultrasonic transmission/reception device 11 converts the received reflected wave into an electric signal (step S114). When the ultrasonic receiver 112 has not received the reflected wave relevant to the transmitted ultrasonic wave (No in step S113), the ultrasonic transmission/reception device 11 waits until the reflected wave is received.

The transmitted ultrasonic wave transmitted from the ultrasonic transmitter 111 mounted on one foot may not hit an opposite foot of the foot. In preparation for such a case, after the transmitted ultrasonic wave is transmitted from the ultrasonic transmitter 111, the transmitted ultrasonic wave may be excluded from the measurement target of the step width measurement at the time when the arrival prediction time of the reflected wave of the transmitted ultrasonic wave has passed. For example, the predicted arrival time of the reflected wave is set to a time when the time during which the ultrasonic wave reciprocates in the distance between both feet at the timing when the stride of the user becomes maximum has elapsed from the time when the ultrasonic transmitter 111 transmits the transmitted ultrasonic wave.

After step S114, the ultrasonic transmission/reception device 11 outputs the converted signal to the data acquisition device 12 (step S115). The processing in steps S112 to S115 in FIG. 14 is continued until the reflected wave of the transmitted ultrasonic wave based on the transmission pulse received in step S111 is received. For example, it may be configured to transmit, to the data acquisition device 12, the reception time at which the ultrasonic receiver 112 mounted on the other foot (second foot) receives the ultrasonic wave transmitted from the ultrasonic transmitter 111 of one foot (first foot). The reception time of the transmitted ultrasonic wave in the ultrasonic receiver 112 mounted on the other foot (second foot) is relevant to the time between the transmission time and the reception time of the ultrasonic wave transmitted from the ultrasonic transmitter 111 mounted on one foot (first foot).

[Data Acquisition Device]

Next, an example of an operation of the data acquisition device 12 will be described. Hereinafter, the generation processing (also referred to as step width data generation processing) of the step width data and the generation processing (also referred to as sensor data generation processing) of the sensor data by the data acquisition device 12 will be individually described. The data acquisition device 12 performs the step width data generation processing and the sensor data generation processing in parallel.

<Step Width Data Generation Processing>

Figure 15:
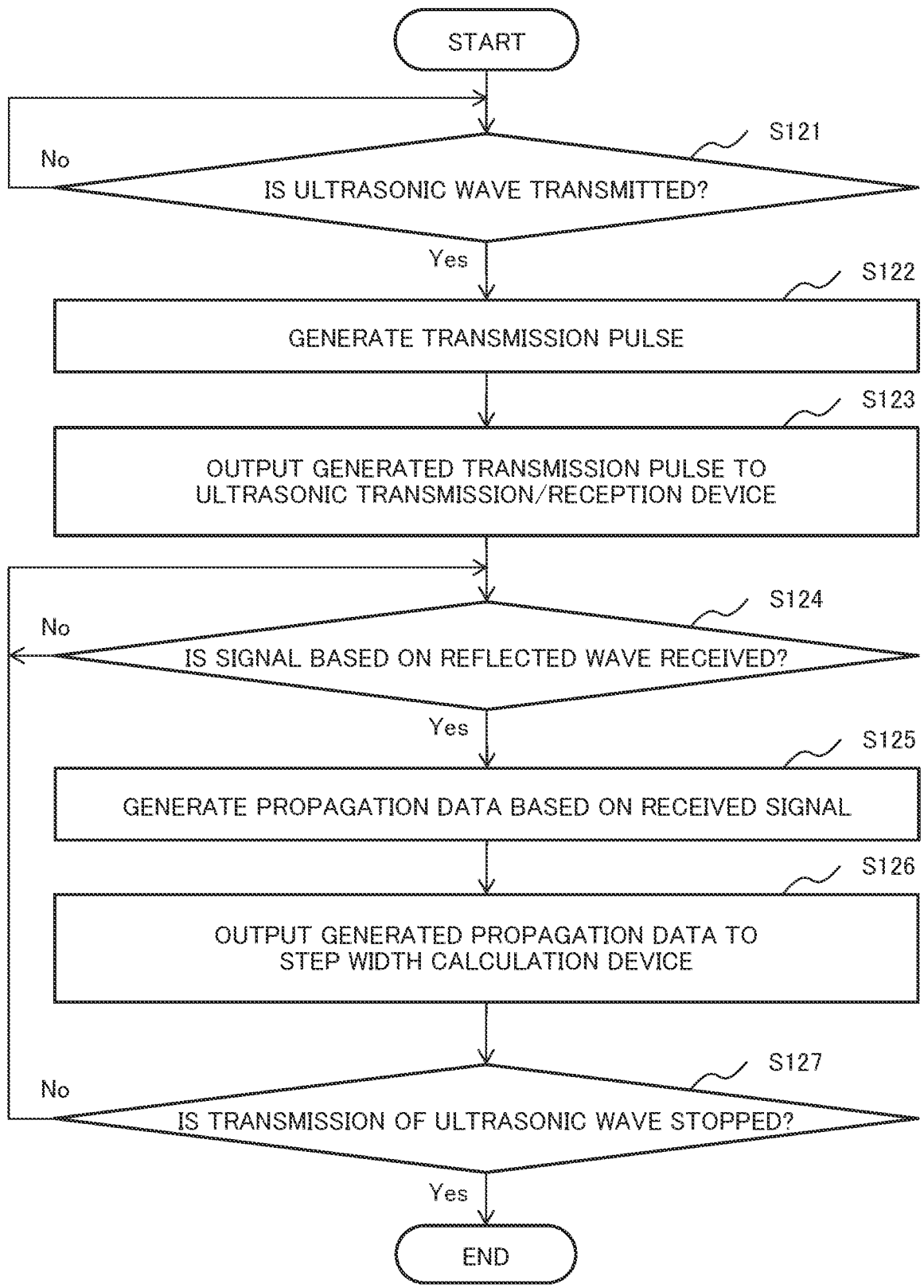
FIG. 15 is a flowchart for describing an example of generation of propagation data by a data acquisition device of the measurement system according to the first example embodiment.

FIG. 15 is a flowchart for describing an example of an operation related to the step width data generation processing by the data acquisition device 12. In FIG. 15, at the timing of transmitting ultrasonic wave (Yes in step S121), the data acquisition device 12 generates the transmission pulse for setting the pulse of the ultrasonic wave transmitted from the ultrasonic transmitter 111 of the ultrasonic transmission/reception device 11 (step S122). When it is not the timing of transmitting ultrasonic wave (No in step S121), the data acquisition device 12 waits without generating the transmission pulse.

The transmission timing of the ultrasonic wave can be optionally set. For example, the ultrasonic wave transmission timing is set by the step width measurement device 15. For example, when detecting the walking of the user equipped with the data acquisition device 12, the step width measurement device 15 outputs an instruction to transmit the ultrasonic wave to the data acquisition device 12. For example, when the walking is detected by the sensor of the mobile terminal carried by the user, the step width measurement device 15 outputs an instruction to transmit the ultrasonic wave to the data acquisition device 12. For example, based on the sensor data output from the data acquisition device 12, the step width measurement device 15 may output an instruction to transmit the ultrasonic wave to the data acquisition device 12 in accordance with the gait event detected based on the time series data (also referred to as a gait waveform) of the sensor data. For example, when detecting the stance phase during the walking of the user equipped with the data acquisition device 12, the step width measurement device 15 outputs an instruction to transmit the ultrasonic wave to the data acquisition device 12. In the stance phase, since the position of the ultrasonic transmission/reception device 11 does not change so much, the transmission direction of the transmitted ultrasonic wave is stabilized. For example, in a case where the data acquisition device 12 can detect the walking of the user, the timing at which the walking of the user is detected may be set as the transmission timing of the ultrasonic wave.

After step S122, the data acquisition device 12 outputs the generated transmission pulse to the ultrasonic transmission/reception device 11 (step S123). The ultrasonic transmission/reception device 11 that has acquired the transmission pulse output from the data acquisition device 12 transmits the transmitted ultrasonic wave relevant to the transmission pulse from the ultrasonic transmitter 111.

Here, when receiving the signal based on the reflected wave of the ultrasonic wave transmitted from the ultrasonic transmitter 111 (Yes in step S124), the data acquisition device 12 generates the propagation data based on the received signal (step S125). For example, the data acquisition device 12 generates the propagation data including the reception time of the reflected wave of the transmitted ultrasonic wave and the transmission time of the transmitted ultrasonic wave. For example, the data acquisition device 12 generates the propagation data including the time (propagation time) of the difference between the reception time of the reflected wave of the transmitted ultrasonic wave and the transmission time of the transmitted ultrasonic wave. When the signal based on the reflected wave of the transmitted ultrasonic wave is not received (No in step S124), the ultrasonic transmission/reception device 11 waits until the signal based on the reflected wave is received.

The transmitted ultrasonic wave transmitted from the ultrasonic transmitter 111 mounted on one foot may not hit an opposite foot of the foot. In preparation for such a case, after the transmitted ultrasonic wave is transmitted from the ultrasonic transmitter 111, the transmitted ultrasonic wave may be excluded from the measurement target of the step width measurement at the time when the arrival prediction time of the reflected wave of the transmitted ultrasonic wave has passed.

After step S125, the data acquisition device 12 outputs the generated propagation data to the step width measurement device 15 (step S126). The propagation data output to the step width measurement device 15 is used for measuring the step width. For example, the data acquisition device 12 may be configured to transmit the reception time when the ultrasonic wave transmitted from the ultrasonic transmitter 111 of the foot in the stance phase is received by the ultrasonic receiver 112 mounted on the foot in the swing period to the step width measurement device 15.

Here, in the case of the timing to stop the transmission of the ultrasonic wave (Yes in step S127), the processing along the flowchart of FIG. 15 is ended. On the other hand, when it is not the timing to stop the transmission of the ultrasonic wave (No in step S127), the process returns to step S124.

The timing at which the transmission of the ultrasonic wave is stopped can be optionally set. For example, the timing to stop the transmission of the ultrasonic wave is set by the step width measurement device 15. For example, when detecting a stop of the walking of the user equipped with the data acquisition device 12, the step width measurement device 15 outputs an instruction to stop the transmission of the ultrasonic wave to the data acquisition device 12. For example, when detecting the swing phase during the walking of the user equipped with the data acquisition device 12, the step width measurement device 15 outputs an instruction to stop the transmission of the ultrasonic wave to the data acquisition device 12. In the swing phase, since the position of the ultrasonic transmission/reception device 11 greatly changes, the transmission direction of the transmitted ultrasonic wave is not stabilized. For example, in a case where the data acquisition device 12 can detect the stop of walking of the user, the timing at which the stop of walking of the user is detected may be set as the transmission timing of the ultrasonic wave.

<Sensor Data Generation Processing>

Figure 16:
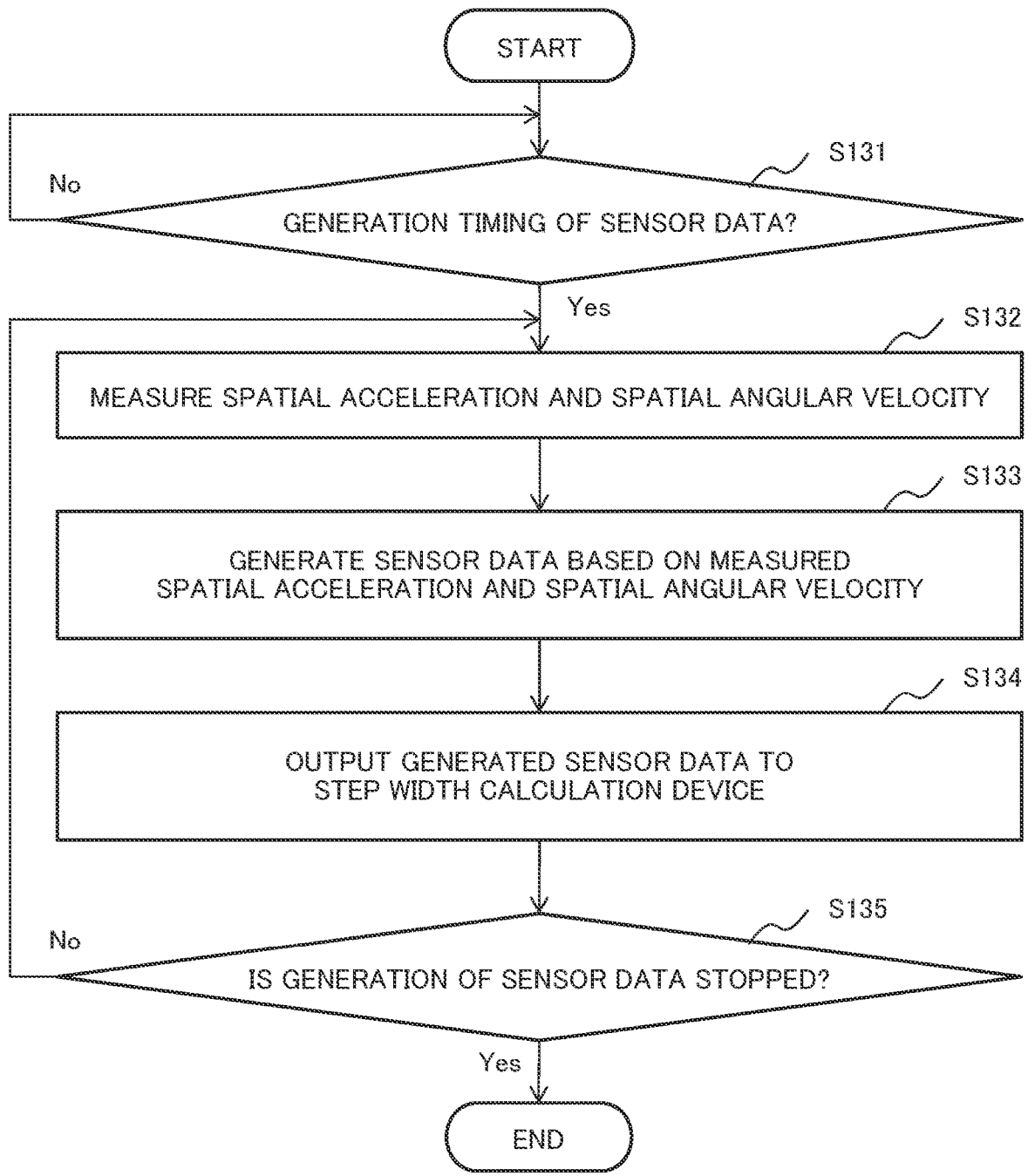
FIG. 16 is a flowchart for describing an example of generation of sensor data by the data acquisition device of the measurement system according to the first example embodiment.

FIG. 16 is a flowchart for describing an example of the operation related to the sensor data generation processing by the data acquisition device 12. In FIG. 16, at the generation timing of the sensor data (Yes in step S131), the data acquisition device 12 measures the accelerations (also referred to as spatial angular velocities) in the three-axis direction and the angular velocities (also referred to as a spatial angular velocity) around the three axes (step S132). In a case where it is not the generation timing of the sensor data (No in step S131), the data acquisition device 12 waits without measuring the accelerations or the angular velocities in the three-axis direction.

Next, the data acquisition device 12 generates sensor data based on the measured spatial acceleration and spatial angular velocity (step S133). The generation timing of the sensor data can be optionally set. For example, the sensor data generation timing is set by the step width measurement device 15. For example, when detecting the walking of the user equipped with the data acquisition device 12, the step width measurement device 15 outputs an instruction to generate the sensor data to the data acquisition device 12. For example, when the walking is detected by the sensor of the mobile terminal carried by the user, the step width measurement device 15 outputs an instruction to generate the sensor data to the data acquisition device 12. For example, in a case where the data acquisition device 12 can detect the walking of the user, the timing at which the walking of the user is detected may be set as the generation timing of the sensor data.

Next, the data acquisition device 12 outputs the generated sensor data to the step width measurement device 15 (step S134). The sensor data output to the step width measurement device 15 is used for generating a gait waveform, detecting a gait event, measuring a step width, and the like.

Here, in the case of the timing to stop the generation of the sensor data (Yes in step S135), the processing along the flowchart of FIG. 16 is ended. On the other hand, when it is not the timing to stop the generation of the sensor data (No in step S135), the process returns to step S132.

The timing to stop the generation of the sensor data can be optionally set. For example, the timing to stop the generation of the sensor data is set by the step width measurement device 15. For example, when detecting a stop of the walking of the user equipped with the data acquisition device 12, the step width measurement device 15 outputs an instruction to stop the generation of the sensor data to the data acquisition device 12. For example, in a case where the data acquisition device 12 can detect the stop of walking of the user, the timing at which the stop of the walking of the user is detected may be set as the timing at which the generation of the sensor data is stopped.

[Step Width Measurement Device]

Figure 17:
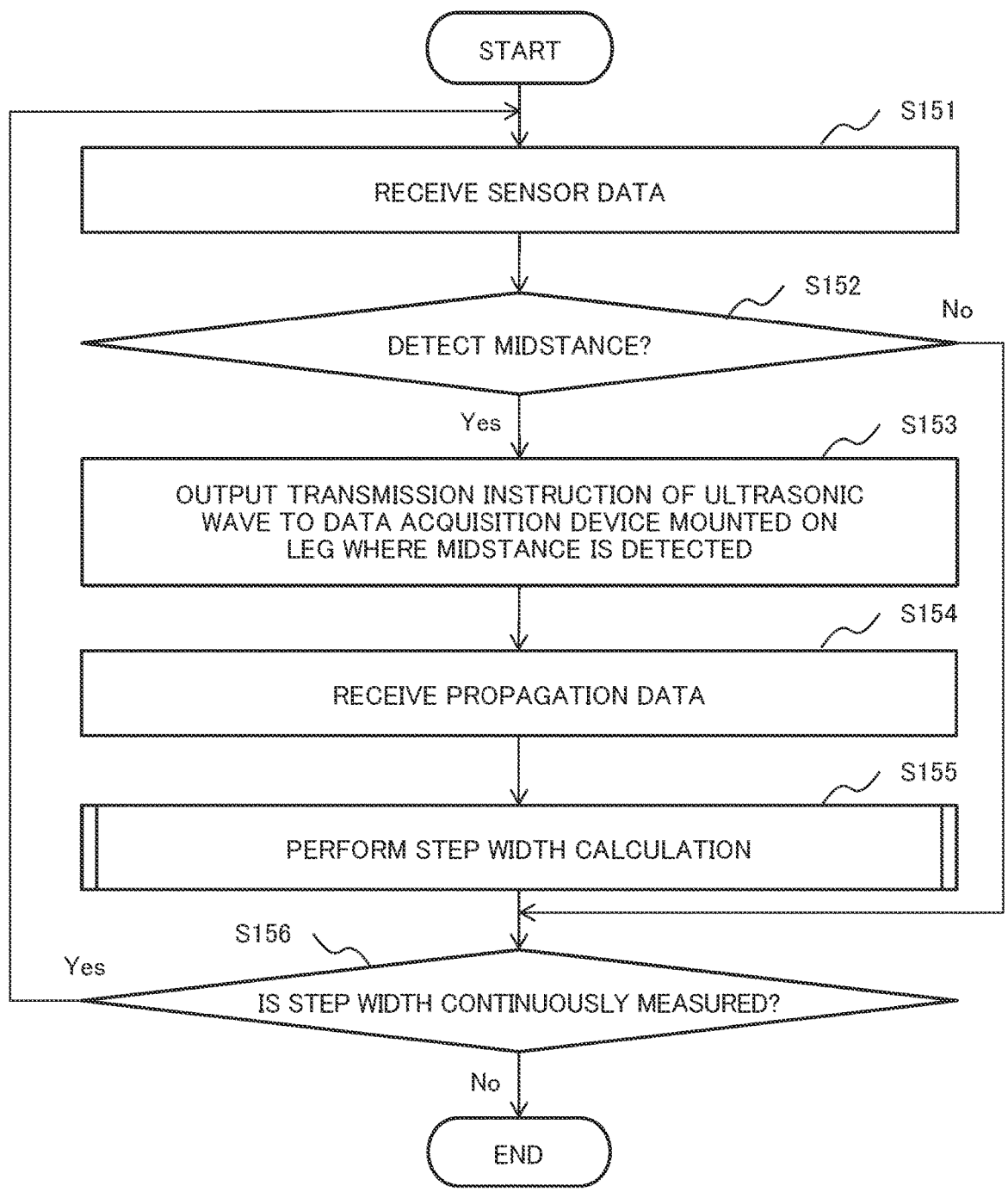
FIG. 17 is a flowchart for describing an example of an operation of the step width measurement device of the measurement system according to the first example embodiment.

Next, an example of an operation of the step width measurement device 15 will be described with reference to the drawings. FIG. 17 is a flowchart for describing an example of the step width measurement device 15. In the flowchart of FIG. 17, an example will be described in which the reception of the sensor data is set as a start point, and the generation/stop of the ultrasonic wave is instructed based on the gait event detected from the sensor data. In the example of FIG. 17, an example will be described in which the timing of the midstance stage included in the stance phase is set to the measurement time (first time) of the step width.

In FIG. 17, first, the step width measurement device 15 receives the sensor data from the data acquisition device 12 (step S151). The step width measurement device 15 detects the gait event based on the received sensor data (step S152). For example, when the walking is detected by the sensor of the mobile terminal carried by the user, the step width measurement device 15 outputs an instruction to acquire the sensor data to the data acquisition device 12.

When the midstance stage is detected based on the received sensor data (Yes in step S152), the step width measurement device 15 outputs the transmission instruction of the transmitted ultrasonic wave to the data acquisition device 12 mounted on the foot of the side where the stance phase is detected (step S153). When the midstance stage is not detected (No in step S152), the process proceeds to step S156.

For example, the step width measurement device 15 detects the midstance stage based on the timing of the heel strike detected using the gait waveform of the traveling direction acceleration (Y-direction acceleration) or the height direction acceleration (Z-direction acceleration). For example, the step width measurement device 15 detects, as the timing of the heel strike, the timing of the midpoint between the timing at which the maximum peak is detected and the timing at which the minimum peak appearing next to the maximum peak is detected, in the gait waveform of the traveling direction acceleration for one gait cycle. For example, the step width measurement device 15 may detect the midstance stage based on a gait event such as heel rise, an opposite toe off, or an opposite heel strike included in the stance phase. For example, the step width measurement device 15 detects a gait event such as a heel rise, an opposite toe off, or an opposite heel strike by using a gait waveform such as a roll angular velocity.

After step S153, the step width measurement device 15 receives the propagation data (step S154). Next, the step width measurement device 15 executes step width calculating processing (step S155). Details of the step width calculation processing will be described later.

In a case of No in step S152 or in a case where the measurement of the step width is continued after step S155 (Yes in step S156), the process returns to step S151. On the other hand, in a case where the measurement of the step width is not continued (No in step S156), the process according to the flowchart in FIG. 17 is ended.

<Step Width Calculation Processing>

Figure 18:
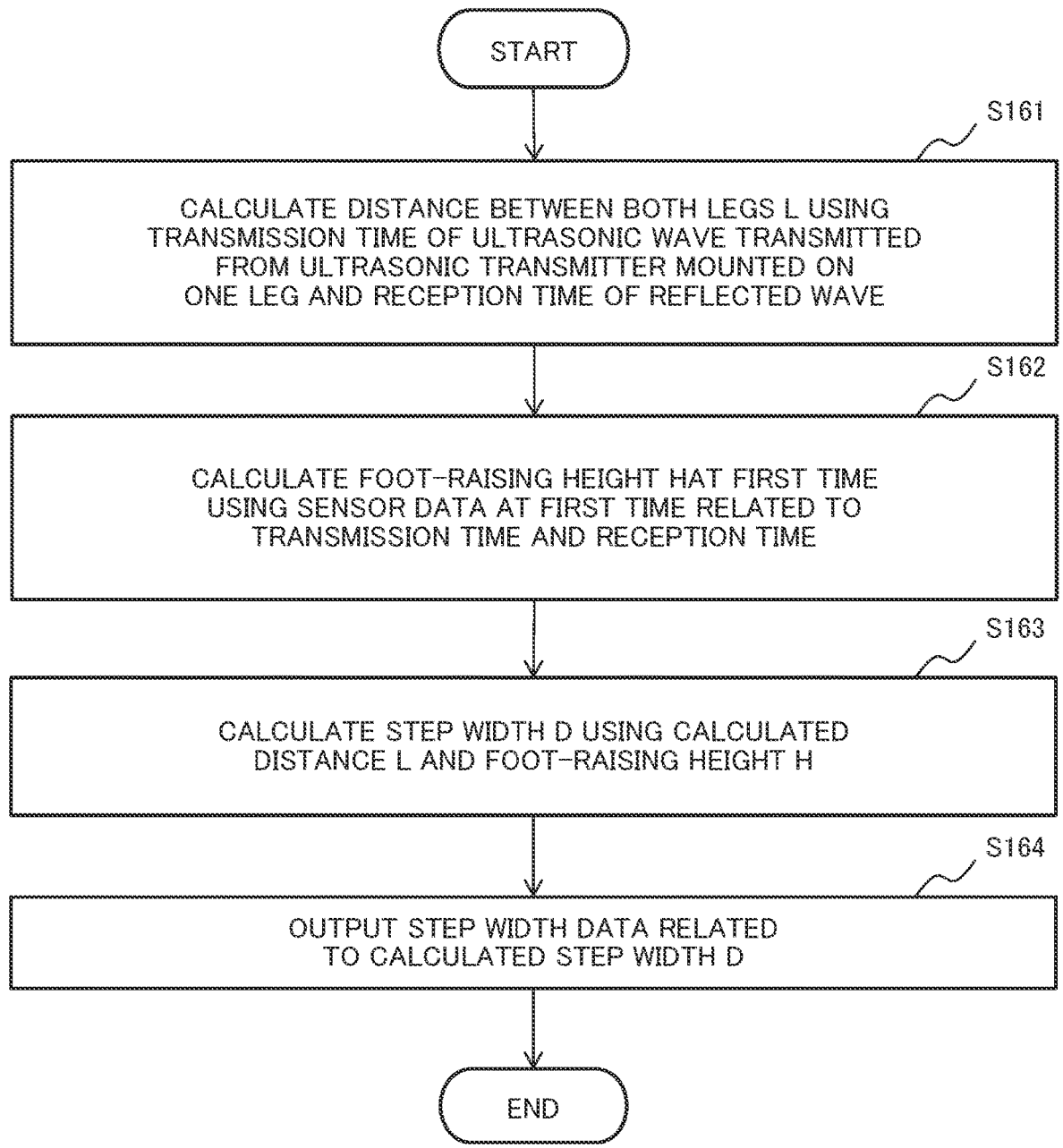
FIG. 18 is a flowchart for describing an example of step width calculation processing by the step width measurement device of the measurement system according to the first example embodiment.

Next, an example of the step width calculation processing by the step width measurement device 15 will be described with reference to the drawings. FIG. 18 is a flowchart for describing an example of the step width calculating processing (step S155 in FIG. 17) by the step width measurement device 15.

In FIG. 18, first, the step width measurement device 15 calculates the distance L between both feet by using the transmission time of the ultrasonic wave transmitted from the ultrasonic transmitter 111 mounted on one foot and the reception time of the reflected wave of the transmitted ultrasonic wave (step S161). For example, the step width measurement device 15 calculates the distance L between both feet by multiplying the propagation time of the ultrasonic wave calculated by subtracting the transmission time of the transmitted ultrasonic wave from the reception time of the reflected wave of the transmitted ultrasonic wave by the sound velocity.

Next, using the sensor data at the first time related to the transmission time of the transmitted ultrasonic wave and the reception time of the reflected wave of the transmitted ultrasonic wave, the step width measurement device 15 calculates a foot-raising height H (also referred to as a sensor height) at the reception time (step S162). The first time is any time between the transmission time and the reception time, and may be the transmission time or the reception time. For example, the step width measurement device 15 calculates the foot-raising height H by performing the second-order integration on the acceleration (Z-direction acceleration) in the height direction included in the sensor data acquired by the data acquisition device 12 mounted on the other foot. For example, the step width measurement device 15 may calculate the foot-raising height H at the reception time by using the sensor data relevant to the reception time of the reception ultrasonic wave received by the ultrasonic receiver 112 mounted on the other foot.

For example, the transmitted ultrasonic wave may be transmitted from the ultrasonic transmitter 111 mounted on the other foot at the timing when the ultrasonic wave transmitted from the ultrasonic transmitter 111 mounted on the other foot is received by the ultrasonic receiver 112 mounted on the other foot. In that case, the step width measurement device 15 can calculate the round-trip time of the ultrasonic wave using the transmission time of the ultrasonic wave transmitted from the ultrasonic transmitter 111 mounted on the other foot and the reception time of the reflected wave of the transmitted ultrasonic wave.

Next, the step width measurement device 15 calculates the step width D at the transmission time of the transmitted ultrasonic wave using the calculated distance L between both feet and the foot-raising height H (step S163).

Next, the step width measurement device 15 outputs step width data related to the calculated step width D (step S164). The step width data output from the step width measurement device 15 is used for various applications.

As described above, the measurement system of the present example embodiment includes the ultrasonic transmission/reception device, the data acquisition device, and the step width measurement device. The ultrasonic transmission/reception device is mounted on each of both feet of the user. The ultrasonic transmission/reception device is arranged in such a way that the transmission/reception direction of an ultrasonic wave faces the inside of the foot. The data acquisition device is arranged on each of both feet of the user. The data acquisition device measures the spatial acceleration and the spatial angular velocity according to the walking of the user, and generates the sensor data based on the measured spatial acceleration and spatial angular velocity. Furthermore, the data acquisition device controls the ultrasonic transmission/reception devices mounted on each of both feet of the user, and generates the propagation data related to the transmission/reception times of the ultrasonic waves transmitted/received by the ultrasonic transmission/reception devices. The data acquisition device transmits the generated sensor data and the propagation data to the step width measurement device.

The step width measurement device according to the present example embodiment includes a distance calculation unit, a height calculation unit, a step width calculation unit, and a measurement control unit. The distance calculation unit calculates the distance between both feet of the user by using the propagation data related to the transmission/reception time of the ultrasonic wave transmitted/received by the ultrasonic transmission/reception device mounted on each of both feet of the user. The height calculation unit calculates the height of the sensor by using the sensor data including the spatial accelerations and the spatial angular velocities measured by the sensors mounted on each of both feet of the user. The step width calculation unit calculates the step width of the user by using the distance between both feet and the height of the sensor measured at the same timing. The measurement control unit detects the gait parameter in the walking of the user based on the sensor data, and controls the data acquisition device according to the timing at which the gait parameter is detected.

The step width, which is one of the gait parameters, is an indicator of a condition of a pedestrian. For example, when the step width increases, energy consumption during walking increases, and fatigue easily occurs. In the elderly, the step width tends to increase. On the other hand, the risk of falling increases when the step width decreases even in an elderly person. Furthermore, in rehabilitation such as knee osteoarthritis and meniscus injury, pain can be alleviated by widening the step width. Therefore, when a step width in daily walking can be measured and information relevant to the measured step width can be provided to a pedestrian, there is a possibility that the condition of the pedestrian can be improved. For example, by using a floor reaction force meter, a pressure-sensitive sheet, a motion sensor, or the like, the step width can be accurately measured. However, in a case where the floor reaction force meter, the pressure-sensitive sheet, the motion sensor, or the like is used, a fixed measurement environment is required, and thus it is not possible to measure the step width during daily walking.

On the other hand, the step width measurement device of the present example embodiment can measure the step width during walking in real time by using the propagation data related to the transmission/reception time of the ultrasonic wave and the sensor data including the spatial acceleration and the spatial angular velocity. Therefore, according to the step width measurement device of the present example embodiment, the step width during daily walking can be measured.

In one aspect of the present example embodiment, the distance calculation unit calculates the distance between both feet associated with the transmission time by using the transmission/reception time of the ultrasonic wave transmitted/received from the ultrasonic transmission/reception device. The distance calculation unit uses the transmission time of the ultrasonic wave transmitted from the ultrasonic transmitter included in the ultrasonic transmission/reception device mounted on the first foot and the reception time of the reflected wave of the transmitted ultrasonic wave received by the ultrasonic receiver included in the ultrasonic transmission/reception device mounted on the first foot. The step width calculation unit calculates the step width of the user by using the distance between both feet associated with the transmission time and the height of the sensor calculated based on the sensor data measured at the transmission time by the sensor mounted on the second foot. According to the present aspect, the step width of the user can be calculated based on the transmission/reception time of the ultrasonic wave transmitted/received from the ultrasonic transmission/reception device mounted on the first foot and the sensor data measured at the first time by the sensor mounted on the second foot.

In one aspect of the present example embodiment, the distance calculation unit calculates the distance between both feet associated with the transmission time by using the transmission/reception time of the ultrasonic wave transmitted/received from the ultrasonic transmission/reception device. The distance calculation unit uses the transmission time of the ultrasonic wave transmitted from the ultrasonic transmitter included in the ultrasonic transmission/reception device mounted on the first foot and the reception time of the reflected wave of the transmitted ultrasonic wave received by the ultrasonic receiver included in the ultrasonic transmission/reception device mounted on the second foot. The step width calculation unit calculates the step width of the user by using the distance between both feet associated with the reception time and the height of the sensor calculated based on the sensor data measured at the reception time by the sensor mounted on the second foot. According to the present aspect, the step width of the user can be calculated based on the transmission/reception time of the ultrasonic wave transmitted/received from the ultrasonic transmission/reception device mounted on the first foot and the second foot and the sensor data measured at the first time by the sensor mounted on the second foot.

In one aspect of the present example embodiment, the measurement control unit detects the midstance stage based on the time series data of the parameters related to the spatial acceleration and the spatial angular velocity included in the sensor data generated by the data acquisition device. The measurement control unit controls the data acquisition device to transmit the ultrasonic wave from the ultrasonic transmission/reception device mounted on the foot in which the midstance stage is detected. According to the present aspect, since the transmitted ultrasonic wave is transmitted from the ultrasonic transmitter mounted on the foot in the stance phase, the transmission direction of the transmitted ultrasonic wave is stabilized, and the measurement accuracy of the step width is improved. In addition, according to the present aspect, since the ultrasonic wave is not transmitted from the ultrasonic transmission/reception device in the period of the swing phase, the power consumption of the ultrasonic transmission/reception device can be reduced.

The step width data obtained by the method of the present example embodiment can be applied to various applications. For example, in daily walking, when a road is muddy or a road surface is frozen, the step width changes according to the road surface condition. Therefore, when a model in which the characteristics of the step width according to the road surface condition are learned is constructed, the road surface condition can be estimated according to the value or change of the step width. For example, the step width may change according to the physical condition or condition of the user. Therefore, when the model in which the characteristics of the step width according to the physical condition of the user are learned is constructed, the physical condition or condition of the user can be estimated according to the value or change of the step width.

Second Example Embodiment

Next, a measurement system according to a second example embodiment will be described with reference to the drawings. The measurement system of the present example embodiment is different from that of the first example embodiment in the number of ultrasonic receivers included in the ultrasonic transmission/reception device. In addition, the measurement system of the present example embodiment is different from that of the first example embodiment in that the times of the data acquisition devices mounted on both feet are synchronized. In the present example embodiment, an example in which two ultrasonic receivers are included will be described, but three or more ultrasonic receivers may be included. In addition, the number of ultrasonic transmitters included in the ultrasonic transmission/reception device may be plural.

(Configuration)

Figure 19:
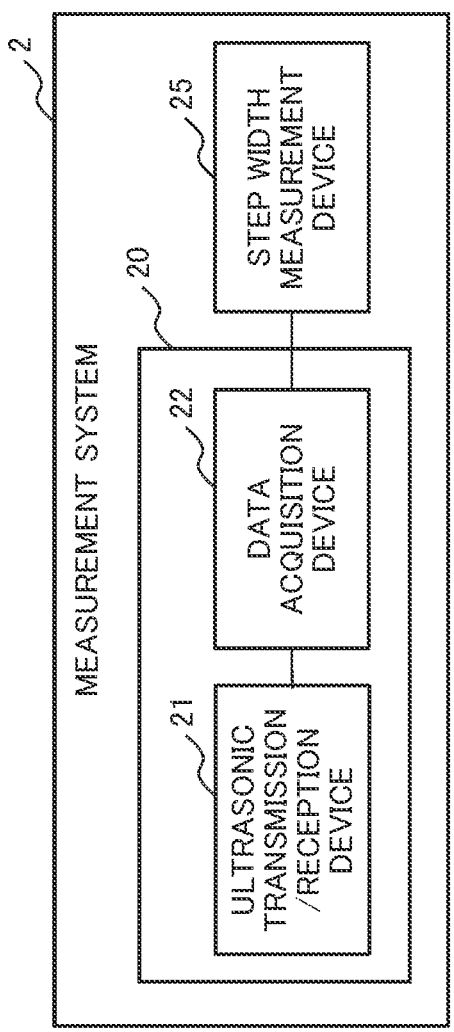
FIG. 19 is a block diagram illustrating an example of a configuration of a measurement system according to a second example embodiment.

FIG. 19 is a block diagram illustrating an example of a configuration of a measurement system 2 according to the present example embodiment. The measurement system 2 includes an ultrasonic transmission/reception device 21, a data acquisition device 22, and a step width measurement device 25. The ultrasonic transmission/reception device 21 and the data acquisition device 22 constitute a data measurement device 20. The ultrasonic transmission/reception device 21 and the data acquisition device 22 are connected in a wired manner. The data acquisition device 22 and the step width measurement device 25 may be connected in a wired or wireless manner. The ultrasonic transmission/reception device 21, the data acquisition device 22, and the step width measurement device 25 may be constituted by a single device. Furthermore, the measurement system 2 may not include the ultrasonic transmission/reception device 21 or the data acquisition device 22, and may be constituted by only the step width measurement device 25. Since the configuration of the data acquisition device 22 is similar to that of the data acquisition device 12 of the first example embodiment, a detailed description thereof will be omitted.

[Ultrasonic Transmission/Reception Device]

Figure 20:
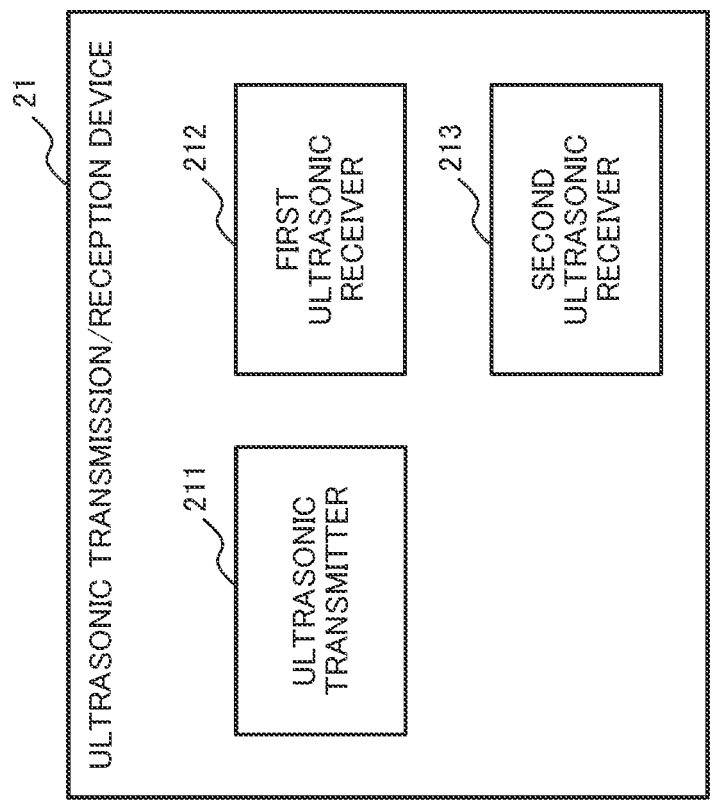
FIG. 20 is a block diagram illustrating an example of a configuration of an ultrasonic transmission/reception device included in the measurement system according to the second example embodiment.

FIG. 20 is a block diagram illustrating an example of a configuration of the ultrasonic transmission/reception device 21. The ultrasonic transmission/reception device 21 includes an ultrasonic transmitter 211, a first ultrasonic receiver 212, and a second ultrasonic receiver 213. The ultrasonic transmitter 211 has a configuration similar to that of the ultrasonic transmitter 111 of the first example embodiment. The first ultrasonic receiver 212 and the second ultrasonic receiver 213 have configurations similar to those of the ultrasonic receiver 112 of the first example embodiment.

Figure 21:
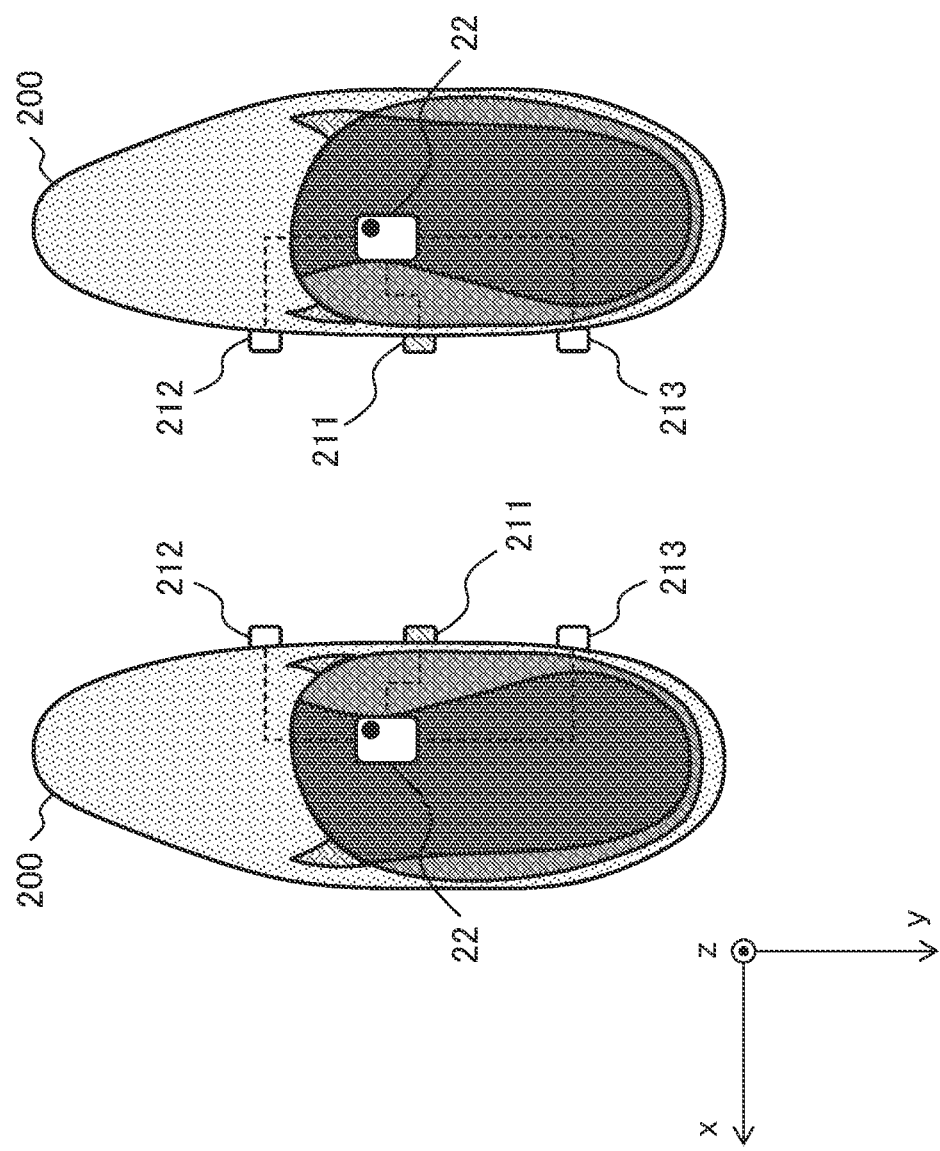
FIG. 21 is a block diagram illustrating an arrangement example of a data acquisition device, an ultrasonic transmitter, and an ultrasonic receiver included in the measurement system according to the second example embodiment.

FIG. 21 is a conceptual diagram illustrating an example in which the ultrasonic transmitter 211, the first ultrasonic receiver 212, the second ultrasonic receiver 213, and the data acquisition device 22 are arranged on the shoe 200. The ultrasonic transmitter 211, the first ultrasonic receiver 212, and the second ultrasonic receiver 213 are connected to the data acquisition device 22 in a wired manner. The ultrasonic transmitter 211, the first ultrasonic receiver 212, the second ultrasonic receiver 213, and the data acquisition device 22 may be integrated.

The ultrasonic transmitter 211 mounted on the right foot is arranged outside the shoe 200 of the right foot in such a way that a transmission unit of the ultrasonic wave faces the inside of the left foot (foot side surface on a thumb side). The first ultrasonic receiver 212 and the second ultrasonic receiver 213 mounted on the right foot are arranged outside the shoe 200 of the right foot in such a way that the reception unit of the ultrasonic waves faces the inside of the left foot. The ultrasonic transmitter 211 mounted on the right foot is arranged outside the shoe 200 of the right foot in such a way that the transmission unit of the ultrasonic waves faces an inside of the left foot. The first ultrasonic receiver 212 and the second ultrasonic receiver 213 mounted on the left foot are arranged outside the shoe 200 of the left foot in such a way that the reception unit of the ultrasonic waves faces the inside of the right foot. The ultrasonic transmitter 211, the first ultrasonic receiver 212, and the second ultrasonic receiver 213 may be mounted inside the left and right shoes 200 of the user. For example, by opening a through hole or providing a mesh-like part in the part of the shoe 200 facing the transmission unit of the ultrasonic transmitter 211 and the reception units of the first ultrasonic receiver 212 and the second ultrasonic receiver 213, these configurations can be arranged inside the shoe 200.

For example, one or both of the first ultrasonic receiver 212 and the second ultrasonic receiver 213 may be used to receive the ultrasonic wave transmitted from the ultrasonic transmitter 211. For example, in a case where the transmitted ultrasonic wave is received using the first ultrasonic receiver 212 and the second ultrasonic receiver 213, the propagation data may be generated by averaging the time when the reflected wave is received by these receivers or by using the time when the reflected wave is previously received.

[Step Width Measurement Device]

Figure 22:
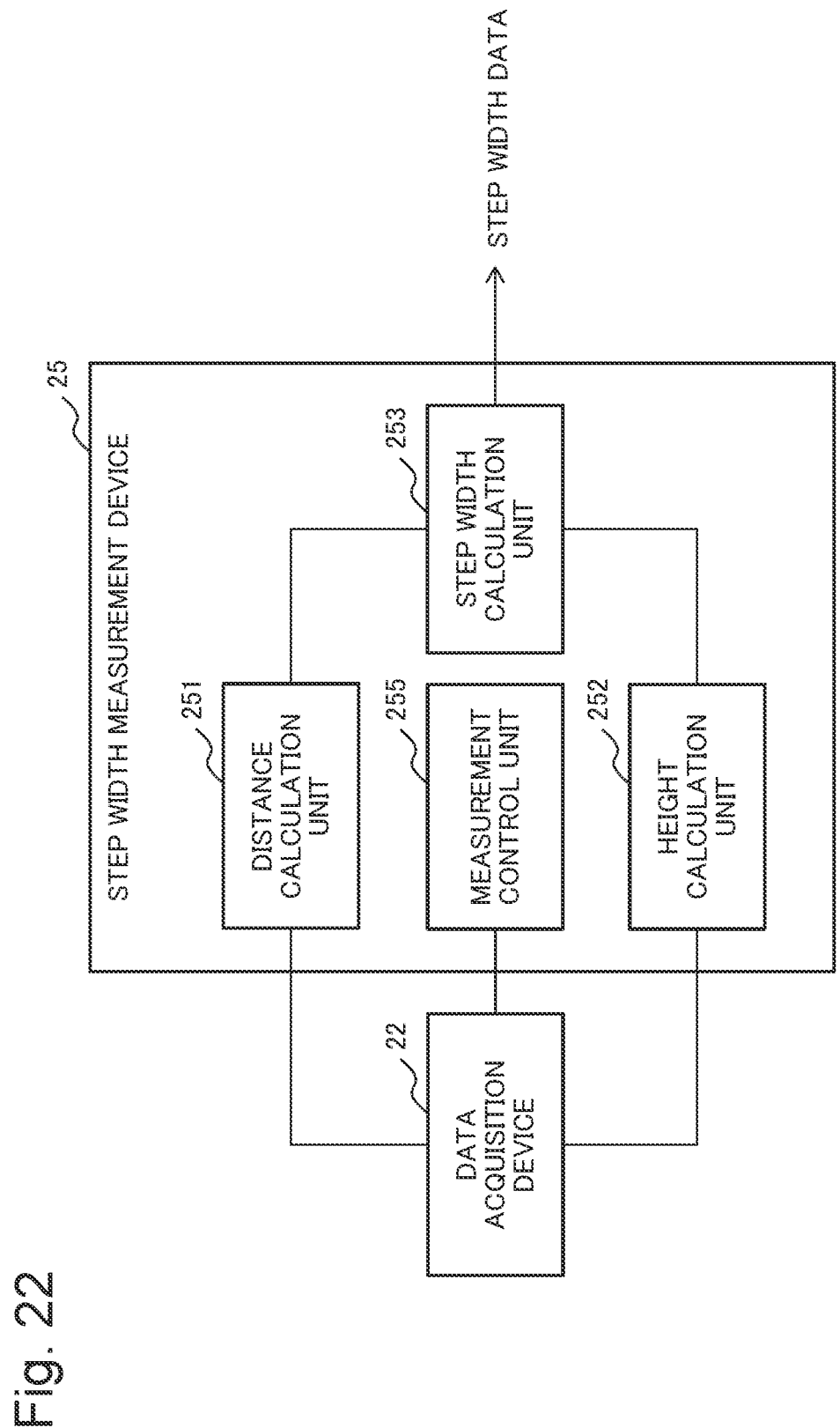
FIG. 22 is a block diagram illustrating an example of a configuration of a step width measurement device included in the measurement system according to the second example embodiment.

FIG. 22 is a block diagram illustrating an example of a configuration of the step width measurement device 25. The step width measurement device 25 includes a distance calculation unit 251, a height calculation unit 252, a step width calculation unit 253, and a measurement control unit 255. In the configuration of FIG. 22, an acquisition unit that acquires propagation data and sensor data and an output unit that outputs step width data are omitted. In addition, since the distance calculation unit 251, the height calculation unit 252, and the step width calculation unit 253 are similar to the corresponding configurations of the first example embodiment, the detailed description thereof will be omitted.

The measurement control unit 255 controls the data acquisition device 22 in order to measure the sensor data and the propagation data. A method of controlling the data acquisition device 22 by the measurement control unit 255 in the measurement of the sensor data or the propagation data is similar to that of the first example embodiment, and thus the description thereof will be omitted.

Furthermore, the measurement control unit 255 synchronizes the times of the data acquisition devices 22 installed in the left and right shoes 200 using the transmitted ultrasonic waves transmitted from the ultrasonic transmitters 211 installed in the left and right shoes 200 at a predetermined timing. The measurement control unit 255 synchronizes the times of the data acquisition devices 22 installed in the left and right shoes 200 in accordance with the timing at which the synchronization pulse is output from the data acquisition devices 22 installed in the left and right shoes 200 to the ultrasonic transmitter 211.

For example, the measurement control unit 255 synchronizes the times of the data acquisition devices 22 installed in the shoes 200 of the left and right feet at a preset time. For example, the measurement control unit 255 synchronizes the times of the data acquisition devices 22 installed on the left and right shoes 200 in accordance with the timing at which the measurement system 2 is activated. For example, the measurement control unit 255 synchronizes the times of the data acquisition devices 22 installed in the shoes 200 of the left and right feet at the timing when the walking of the user wearing the shoes 200 in which the data acquisition device 22 is installed is detected by the step width measurement device 25. For example, the measurement control unit 255 synchronizes the times of the data acquisition devices 22 installed in the shoes 200 of the left and right feet at the timing when the stop of the walking of the user wearing the shoes 200 in which the data acquisition device 22 is installed is detected by the step width measurement device 25. The frequency of the synchronization control of the data acquisition devices 22 installed in the left and right shoes 200 may be set according to the measurement accuracy of the step width. As the frequency of the synchronization control of the data acquisition devices 22 installed in the left and right shoes 200 increases, the deviation in the times of the data acquisition devices 22 decreases, and the measurement accuracy of the sensor data and the propagation data is improved.

For example, the measurement control unit 255 outputs a notification (also referred to as a synchronization control notification) for performing synchronization control to the mobile terminal of the user at a predetermined timing. For example, the mobile terminal that has acquired the synchronization control notification may be configured to notify the user that the synchronization control notification has been acquired by voice, vibration, screen display, or the like. When the user who uses the mobile terminal confirms the synchronization control notification by voice, vibration, screen display, or the like, the left and right shoes 200 are arranged side by side in such a way that the positions of the toe and the heel are aligned in the traveling direction (Y direction) for synchronization control of the data acquisition devices 22 installed in the left and right shoes 200. For example, the user arranges the left and right shoes 200 side by side by standing upright with both feet aligned in a state where the left and right shoes 200 on which the data acquisition device 22 is installed are worn. For example, the user may arrange the left and right shoes 200 side by side while taking off the left and right shoes 200 on which the data acquisition device 22 is installed. For example, the measurement control unit 255 may automatically start synchronization at a timing when the accelerations of the data acquisition devices 22 mounted on both feet become 0.

Figure 23:
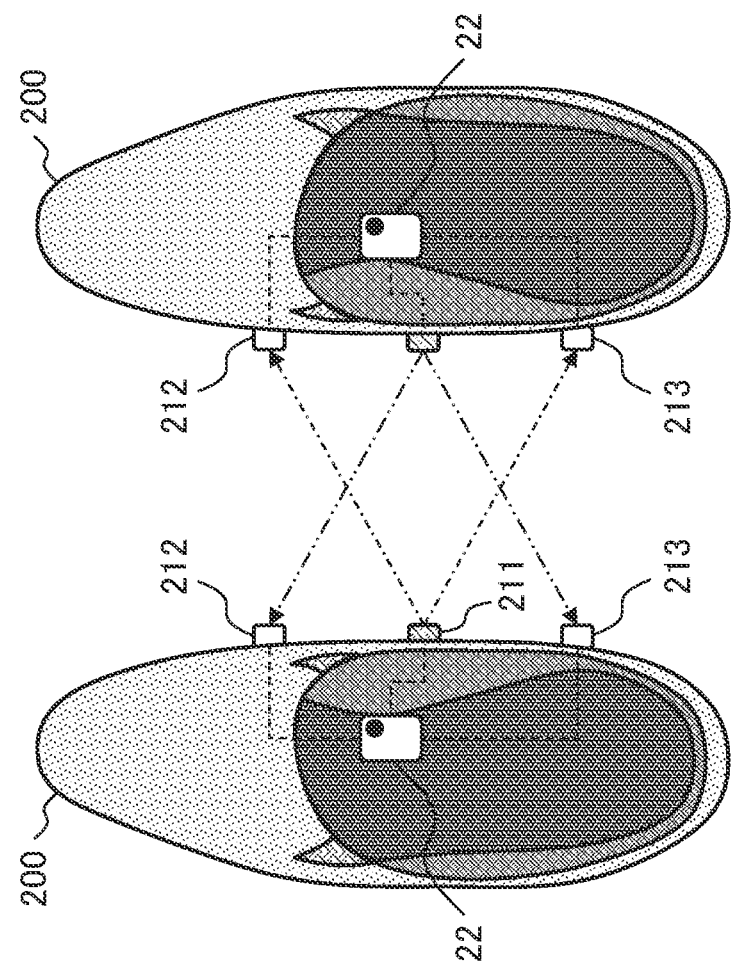
FIG. 23 is a conceptual diagram for describing synchronization control for synchronizing time of a data acquisition device included in the measurement system according to the second example embodiment.

FIG. 23 is a conceptual diagram for describing time synchronization control of the data acquisition devices 22 installed in the left and right shoes 200. In the example of FIG. 23, the first ultrasonic receiver 212 and the second ultrasonic receiver 213 of the shoe 200 with the opposite foot receive the transmitted ultrasonic waves transmitted from the ultrasonic transmitters 211 installed in the left and right shoes 200.

For example, the measurement control unit 255 fixes the transmission time of the transmitted ultrasonic wave from the ultrasonic transmitter 211 installed in one shoe 200, and shifts the transmission time of the transmitted ultrasonic wave from the ultrasonic transmitter 211 installed in the other shoe 200 by a predetermined time. The measurement control unit 255 shifts the transmission time of the transmitted ultrasonic wave from the ultrasonic transmitter 211 installed in the other shoe 200 in such a way to reduce the shift of the transmission times of the transmitted ultrasonic waves of both feet. When the deviation between the transmission times of the transmitted ultrasonic waves of both feet becomes equal to or less than the allowable time, the measurement control unit 255 synchronizes the times of the clocks of the data acquisition devices 22 installed in the left and right shoes 200 at that time. For example, the measurement control unit 255 brings the times closer until the times of the data acquisition devices 22 installed on the shoes 200 of both feet become an error of 1 millisecond or less. When the times of the data acquisition devices 22 installed on the shoes 200 of both feet are close to an error of 1 millisecond or less, it is possible to obtain accuracy equal to or less than the error of $\frac{1}{100}$ stride.

(Operation)

Figure 24:
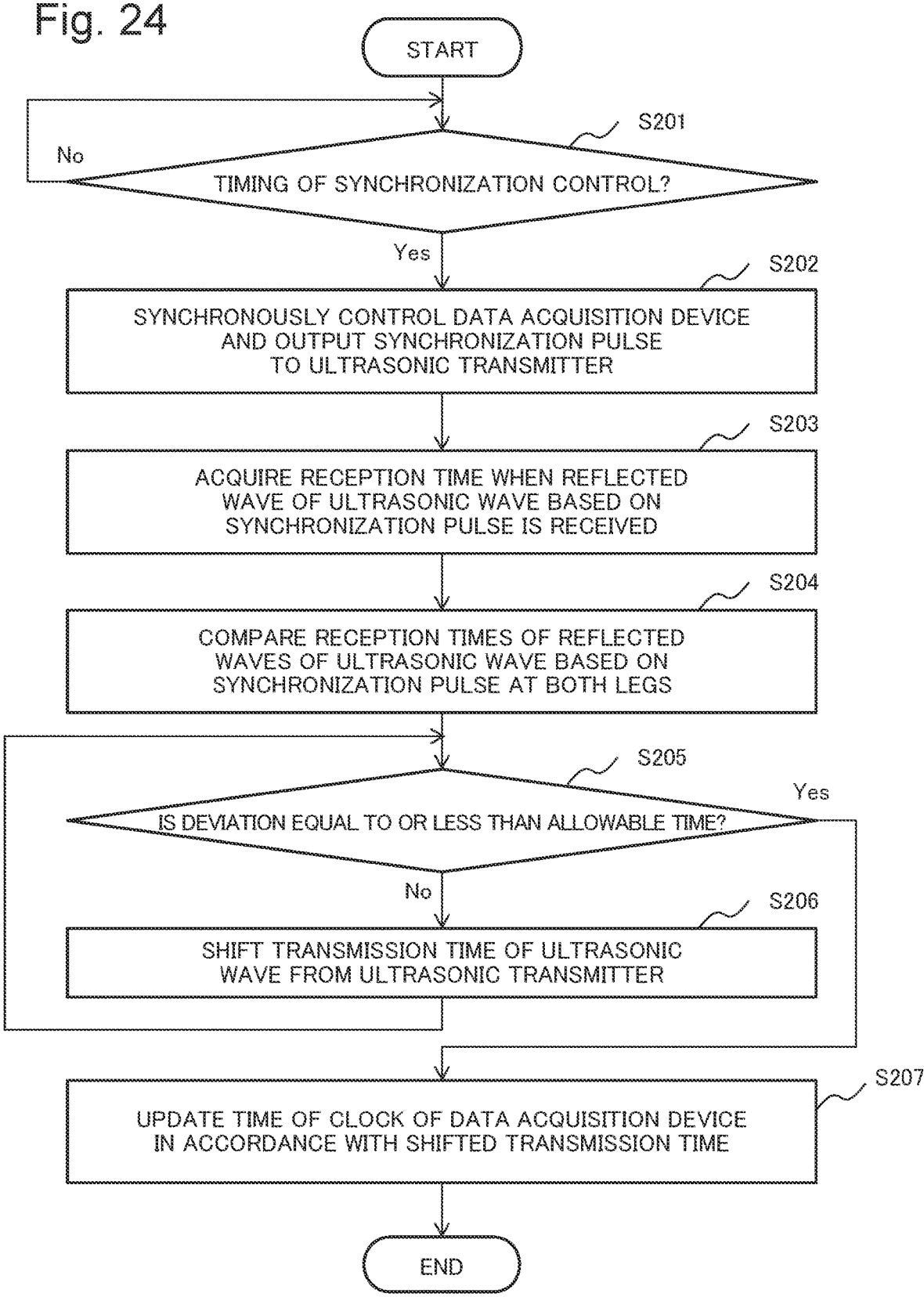
FIG. 24 is a flowchart for describing synchronization control processing by the step width measurement device included in the measurement system according to the second example embodiment.

Next, the synchronization control processing of the times of the data acquisition devices 22 installed on the shoes 200 of both feet by the step width measurement device 25 will be described with reference to the drawings. FIG. 24 is a flowchart for describing the synchronization control processing of the times of the data acquisition devices installed on the shoes 200 of both feet by the step width measurement device 25. In the processing along the flowchart of FIG. 24, the measurement control unit 255 included in the step width measurement device 25 will be described as an operation subject.

In FIG. 24, in the case of the timing of the synchronization control (Yes in step S201), the measurement control unit 255 synchronously controls the data acquisition devices 22 of the shoes 200 of both feet and outputs the synchronization pulses to the ultrasonic transmitters 211 installed in the shoes 200 (step S202). The ultrasonic transmitter 211 that has received the synchronization pulse transmits a transmitted ultrasonic wave relevant to the synchronization pulse. On the other hand, when it is not the synchronization control timing (No in step S201), the measurement control unit 255 waits until the synchronization control timing.

After step S202, the measurement control unit 255 receives the reception time at which the reflected wave of the transmitted ultrasonic wave based on the synchronization pulse is received by the first ultrasonic receiver 212 and the second ultrasonic receiver 213 (step S203).

Next, the measurement control unit 255 compares the reception time of the reflected wave of the transmitted ultrasonic wave based on the synchronization pulse (step S204). When the difference in the reception time of the reflected wave of the ultrasonic wave based on the synchronization pulse is larger than the allowable time (No in step S205), the measurement control unit 255 shifts the transmission time of the ultrasonic wave from the data acquisition device 22 as the time adjustment target (step S206). After step S206, the process returns to step S205. On the other hand, when the difference between the reception times of the reflected waves of the ultrasonic wave based on the synchronization pulse is equal to or less than the allowable time (Yes in step S205), the measurement control unit 255 updates the time of the clock (not illustrated) of the data acquisition device 22 as the time adjustment target in accordance with the shifted transmission time (step S207).

As described above, the measurement system of the present example embodiment includes the ultrasonic transmission/reception device, the data acquisition device, and the step width measurement device. An ultrasonic transmission/reception device, the data acquisition device, and the step width measurement device are provided. The ultrasonic transmission/reception device is mounted on each of both feet of the user. The ultrasonic transmission/reception device is arranged in such a way that the transmission/reception direction of an ultrasonic wave faces the inside of the foot. The data acquisition device is arranged on each of both feet of the user. The data acquisition device measures the spatial acceleration and the spatial angular velocity according to the walking of the user, and generates the sensor data based on the measured spatial acceleration and spatial angular velocity. Furthermore, the data acquisition device controls the ultrasonic transmission/reception devices mounted on each of both feet of the user, and generates the propagation data related to the transmission/reception times of the ultrasonic waves transmitted/received by the ultrasonic transmission/reception devices. The data acquisition device transmits the generated sensor data and the propagation data to the step width measurement device.

The step width measurement device according to the present example embodiment includes a distance calculation unit, a height calculation unit, a step width calculation unit, and a measurement control unit. The distance calculation unit calculates the distance between both feet of the user by using the propagation data related to the transmission/reception time of the ultrasonic wave transmitted/received by the ultrasonic transmission/reception device mounted on each of both feet of the user. The height calculation unit calculates the height of the sensor by using the sensor data including the spatial accelerations and the spatial angular velocities measured by the sensors mounted on each of both feet of the user. The step width calculation unit calculates the step width of the user by using the distance between both feet and the height of the sensor measured at the same timing. The measurement control unit detects a gait parameter in walking of the user based on the time series data of the spatial acceleration and the spatial angular velocity included in the sensor data, and controls the data acquisition device according to a timing at which the gait parameter is detected.

The step width measurement device of the present example embodiment can measure the step width during walking in real time by using the propagation data related to the transmission/reception time of the ultrasonic wave and the sensor data including the spatial acceleration and the spatial angular velocity. Therefore, according to the step width measurement device of the present example embodiment, the step width during daily walking can be measured.

In one aspect of the present example embodiment, the measurement control unit causes the ultrasonic waves to be transmitted from the ultrasonic transmission/reception devices mounted on both feet of the user. The measurement control unit controls the data acquisition device in such a way that the timing at which ultrasonic waves are transmitted from the ultrasonic transmission/reception device on one foot is close to the timing at which ultrasonic waves are transmitted from the ultrasonic transmission/reception device mounted on the other foot. Under such control, the measurement control unit synchronizes the times of the data acquisition devices mounted on both feet of the user. According to the present aspect, it is possible to synchronize the times of the data acquisition devices mounted on both feet by causing the transmission times of the ultrasonic waves transmitted from the ultrasonic transmission/reception devices mounted on both feet to be close to each other.

In the method of the present example embodiment, the ultrasonic wave transmitted from the ultrasonic transmitter mounted on one foot is simultaneously received by the two ultrasonic receivers mounted on the other foot at the timing when both feet are aligned in the lateral direction. Therefore, according to the method of the present example embodiment, since both feet can be synchronized, a more accurate step width can be measured. In addition, according to the method of the present example embodiment, the timing of the foot adjacent can be accurately detected as the timing at which both feet are aligned in the lateral direction. At the timing of the foot adjacent, the distance between both feet is minimized, and the intensity of the reflected wave of the ultrasonic wave transmitted from the ultrasonic transmitter mounted on one foot is maximized. That is, according to the method of the present example embodiment, by specifying the timing of the foot adjacent and measuring the step width, a more accurate step width can be measured.

The synchronization of the times of the data acquisition devices of both feet by the method of the present example embodiment can be applied to other than the measurement of the step width. By synchronizing the times of the data acquisition devices of both feet by the method of the present example embodiment, the times of the sensor data acquired by the data acquisition devices of both feet can be accurately matched. When the times of the sensor data acquired by the data acquisition devices of both feet can be accurately matched, various gait events can be more accurately measured according to the physical quantity based on the movement of both feet.

The synchronization of the times of the data acquisition devices of both feet by the method of the present example embodiment can also be applied to a case where there is a single ultrasonic receiver. In addition, the synchronization of the times of the data acquisition devices of both feet by the method of the present example embodiment can also be applied to a case where there is a plurality of ultrasonic transmitters. That is, the synchronization of the times of the data acquisition devices of both feet by the method of the present example embodiment can be applied to a case where the number of ultrasonic transmitters or ultrasonic receivers is optional regardless of the number of ultrasonic transmitters or ultrasonic receivers.

Third Example Embodiment

Next, a step width measurement device according to a third example embodiment will be described with reference to the drawings. The step width measurement device of the present example embodiment has a configuration in which the step width measurement devices of the first and second example embodiments are simplified. The measurement system may be configured by the step width measurement device of the present example embodiment alone.

Figure 25:
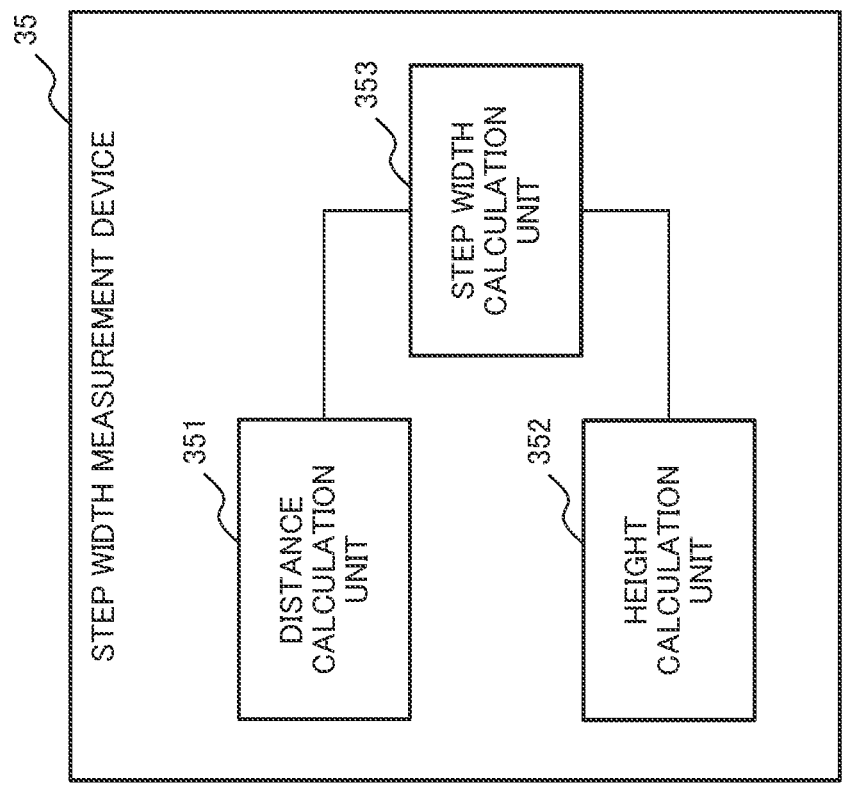
FIG. 25 is a block diagram illustrating an example of a configuration of a step width measurement device according to a third example embodiment.

FIG. 25 is a block diagram illustrating an example of a configuration of a step width measurement device 35 according to the present example embodiment. The step width measurement device 35 includes a distance calculation unit 351, a height calculation unit 352, and a step width calculation unit 353. The distance calculation unit 351 calculates the distance between both feet of the user by using the propagation data related to the transmission/reception times of the ultrasonic waves transmitted/received by the ultrasonic transmission/reception devices mounted on each of both feet of the user. The height calculation unit 352 calculates the height of the sensor by using the sensor data including the spatial accelerations and the spatial angular velocities measured by the sensors mounted on each of both feet of the user. The step width calculation unit 353 calculates the step width of the user by using the distance between both feet and the height of the sensor measured at the same timing.

The step width measurement device of the present example embodiment can measure the step width during walking in real time by using the propagation data related to the transmission/reception time of the ultrasonic wave and the sensor data including the spatial acceleration and the spatial angular velocity. Therefore, according to the step width measurement device of the present example embodiment, the step width during daily walking can be measured.

(Hardware)

Here, a hardware configuration for executing processing of the step width measurement device, the control unit, and the like according to each example embodiment of the present disclosure will be described with a computer 90 of FIG. 26 as an example. The computer 90 in FIG. 26 is a configuration example for executing the processing of the step width measurement device and the like of each example embodiment, and does not limit the scope of the present disclosure.

Figure 26:
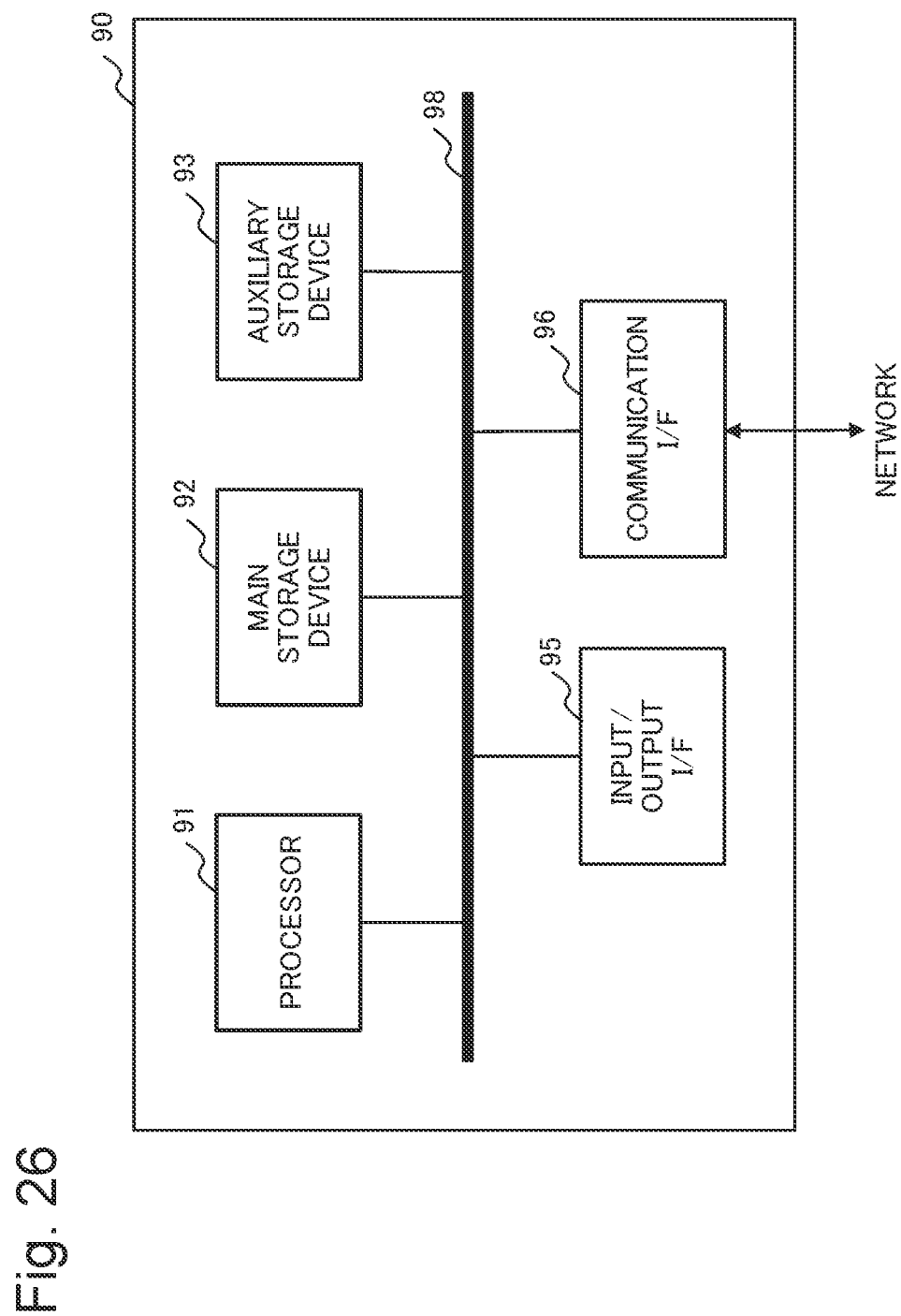
FIG. 26 is a block diagram illustrating an example of a hardware configuration for achieving the step width measurement device of each example embodiment.

As illustrated in FIG. 26, the computer 90 includes a processor 91, a main storage device 92, an auxiliary storage device 93, an input/output interface 95, and a communication interface 96. In FIG. 26, the interface is abbreviated as I/F. The processor 91, the main storage device 92, the auxiliary storage device 93, the input/output interface 95, and the communication interface 96 are data-communicably connected to each other via a bus 98. In addition, the processor 91, the main storage device 92, the auxiliary storage device 93, and the input/output interface 95 are connected to a network such as the Internet or an intranet via the communication interface 96.

The processor 91 develops the program stored in the auxiliary storage device 93 or the like to the main storage device 92. The processor 91 executes a program developed to the main storage device 92. In the present example embodiment, a software program installed in the computer 90 may be used. The processor 91 executes the processing by the step width measurement device or the like according to the present example embodiment.

The main storage device 92 has an area in which the program is developed. The program stored in the auxiliary storage device 93 or the like is developed to the main storage device 92 by the processor 91. The main storage device 92 is achieved by, for example, a volatile memory such as a dynamic random access memory (DRAM). Furthermore, a nonvolatile memory such as a magnetoresistive random access memory (MRAM) may be configured/added as the main storage device 92.

The auxiliary storage device 93 stores various data such as programs. The auxiliary storage device 93 is achieved by a local disk such as a hard disk or a flash memory. Various data may be stored in the main storage device 92, and the auxiliary storage device 93 may be omitted.

The input/output interface 95 is an interface for connecting the computer 90 and a peripheral device based on a standard or a specification. The communication interface 96 is an interface for connecting to an external system or device through a network such as the Internet or an intranet based on a standard or a specification. The input/output interface 95 and the communication interface 96 may be shared as an interface connected to an external device.

If necessary, an input device such as a keyboard, a mouse, or a touch panel may be connected to the computer 90. These input devices are used to input information and settings. When a touch panel is used as the input device, a display screen of the display device may also serve as the interface of the input device. Data communication between the processor 91 and the input device may be mediated by the input/output interface 95.

In addition, the computer 90 may be provided with the display device for displaying information. When the display device is provided, the computer 90 preferably includes a display control device (not illustrated) for controlling the display of the display device. The display device may be connected to the computer 90 via the input/output interface 95.

Furthermore, the computer 90 may be provided with a drive device. The drive device mediates reading of data and a program from a recording medium, writing of a processing result of the computer 90 to the recording medium, and the like between the processor 91 and the recording medium (program recording medium). The drive device may be connected to the computer 90 via the input/output interface 95.

The above is an example of a hardware configuration for enabling the step width measurement device and the like according to each example embodiment of the present invention. The hardware configuration of FIG. 26 is an example of a hardware configuration for executing arithmetic processing of the step width measurement device or the like according to each example embodiment, and does not limit the scope of the present invention. In addition, the program for causing a computer to execute the processing related to the step width measurement device and the like according to each example embodiment is also included in the scope of the present invention. Furthermore, the program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card. Furthermore, the recording medium may be achieved by a magnetic recording medium such as a flexible disk, or another recording medium. When the program executed by the processor is recorded in the recording medium, the recording medium is relevant to the program recording medium.

The components such as the step width measurement device of each example embodiment may be optionally combined. In addition, the components such as the step width measurement device of each example embodiment may be achieved by software or may be achieved by a circuit.

The previous description of example embodiments is provided to enable a person skilled in the art to make and use the present invention. Moreover, various modifications to these example embodiments will be readily apparent to those skilled in the art, and the generic principles and specific examples defined herein may be applied to other example embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A measurement system, comprising:
a step width measurement device comprising:
at least one memory storing instructions; and
at least one processor connected to the at least one memory and configured to execute the instructions to:
calculate a distance between both feet of a user by using propagation data, in which a calculated propagation time, which is a time difference between a transmission time of a transmitted ultrasonic wave and a reception time of a reflected wave of the transmitted ultrasonic wave for each pulse included in a transmission pulse, is associated with a first time related to the transmission time and the reception time used to calculate the propagation time of ultrasonic waves transmitted/received by ultrasonic transmission/reception devices mounted on each of the both feet of the user;
calculate a height of a sensor by using sensor data including a spatial acceleration and a spatial angular velocity measured by sensors mounted on each of the both feet of the user;
calculate a step width of the user by using the distance between the both feet and the height of the sensor, the distance and the height being measured at a same time;
identify a road surface condition as muddy or icy by using a machine learning model trained by road surface conditions of a plurality of situations and step widths calculated under the road surface conditions of the plurality of situations, and input data of the machine learning model is the calculated step width during a walking of the user; and
transmit information relevant to the step width data to be displayed on a screen of a display device; and
a data measurement device configured to be arranged at each of both feet of a user, the data measurement device being configured to:
output a transmission pulse for setting a pulse width of the transmitted ultrasonic wave to the ultrasonic transmission/reception devices mounted on each of the both feet of the user, and
automatically transmit the sensor data and the propagation data to the step width measurement device,
wherein the at least one processor is further configured to execute the instructions to:
detect a gait parameter in walking of the user based on the sensor data and control the data measurement device according to a timing at which the gait parameter is detected,
wherein a midstance stage is detected based on time series data of a parameter related to the spatial acceleration or the spatial angular velocity included in the sensor data generated by the data measurement device, and
wherein controlling the data measurement device is outputting the transmission pulse to the ultrasonic transmission/reception device mounted on a foot in which the midstance stage is detected.

2. The measurement system according to claim 1, wherein the at least one processor is configured to execute the instructions to:
transmit the ultrasonic waves from the ultrasonic transmission/reception devices mounted on the both feet of the user, and
control the data measurement device in such a way that a timing at which the ultrasonic wave is transmitted from the ultrasonic transmission/reception device mounted on one foot approaches a timing at which the ultrasonic wave is transmitted from the ultrasonic transmission/reception device mounted on the other foot, to thereby synchronize the times of the data measurement devices mounted on the both feet of the user.

3. The measurement system according to claim 1, further comprising ultrasonic transmission/reception devices configured to be mounted on each of the both feet of the user and arranged in such a way that a transmission/reception direction of the ultrasonic wave faces an inside of the foot.

4. The measurement system according to claim 1, wherein the at least one processor is configured to execute the instructions to:
display information regarding the step width optimized for a healthcare application on a screen of a display device.

5. The step width measurement device according to claim 1, wherein the at least one processor is configured to execute the instructions to:
calculate the distance between the both feet associated with a transmission time by using the transmission time of the ultrasonic wave transmitted from the ultrasonic transmitter included in the ultrasonic transmission/reception device mounted on a first foot and a reception time of a reflected wave of the transmitted ultrasonic wave received by an ultrasonic receiver included in the ultrasonic transmission/reception device mounted on the first foot, and
calculate the step width of the user by using the distance between the both feet associated with the transmission time and the height of the sensor calculated based on the sensor data measured at the transmission time by the sensor mounted on a second foot.

6. The step width measurement device according to claim 1 wherein the at least one processor is configured to execute the instructions to:
calculate the distance between the both feet associated with a reception time by using the transmission time of the ultrasonic wave transmitted from the ultrasonic transmitter included in the ultrasonic transmission/reception device mounted on a first foot and a reception time of a reflected wave of the transmitted ultrasonic wave received by an ultrasonic receiver included in the ultrasonic transmission/reception device mounted on a second foot, and calculate the step width of the user by using the distance between the both feet associated with the reception time and the height of the sensor calculated based on the sensor data measured at the reception time by the sensor mounted on the second foot.

7. A step width measurement method executed by a computer, the method comprising:
calculating a distance between both feet of a user by using propagation data, in which a calculated propagation time, which is a time difference between a transmission time of a transmitted ultrasonic wave and a reception time of a reflected wave of the transmitted ultrasonic wave for each pulse included in a transmission pulse, is associated with a first time related to the transmission time and the reception time used to calculate the propagation time of ultrasonic waves transmitted/received by ultrasonic transmission/reception devices mounted on each of the both feet of the user;
calculating a height of a sensor by using sensor data including a spatial acceleration and a spatial angular velocity measured by sensors mounted on each of the both feet of the user;
calculating a step width of the user by using the distance between the both feet and the height of the sensor, the distance and the height being measured at a same time;
identifying a road surface condition as muddy or icy by using a machine learning model trained by road surface conditions of a plurality of situations and step widths calculated under the road surface conditions of the plurality of situations, and input data of the machine learning model is the calculated step width during a walking of the user; and
transmitting information relevant to the step width data to be displayed on a screen of a display device;
arranging a data measurement device at each of both feet of a user;
outputting, by the data measurement device, a transmission pulse for setting a pulse width of the transmitted ultrasonic wave to the ultrasonic transmission/reception devices mounted on each of the both feet of the user;
transmitting the sensor data and the propagation data to the step width measurement device; and
detecting a gait parameter in walking of the user based on the sensor data and control the data measurement device according to a timing at which the gait parameter is detected,
wherein a midstance stage is detected based on time series data of a parameter related to the spatial acceleration or the spatial angular velocity included in the sensor data generated by the data measurement device, and
wherein controlling the data measurement device is outputting the transmission pulse to the ultrasonic transmission/reception device mounted on a foot in which the midstance stage is detected.

8. A non-transitory recording medium recorded with a program causing a computer to perform the following processes:
calculating a distance between both feet of a user by using propagation data, in which a calculated propagation time, which is a time difference between a transmission time of a transmitted ultrasonic wave and a reception time of a reflected wave of the transmitted ultrasonic wave for each pulse included in a transmission pulse, is associated with a first time related to the transmission time and the reception time used to calculate the propagation time of ultrasonic waves transmitted/received by ultrasonic transmission/reception devices mounted on each of the both feet of the user;
calculating a height of a sensor by using sensor data including a spatial acceleration and a spatial angular velocity measured by sensors mounted on each of the both feet of the user;
calculating a step width of the user by using the distance between the both feet and the height of the sensor, the distance and the height being measured at a same time;
identifying a road surface condition as muddy or icy by using a machine learning model trained by road surface conditions of a plurality of situations and step widths calculated under the road surface conditions of the plurality of situations, and input data of the machine learning model is the calculated step width during a walking of the user; and
transmitting information relevant to the step width data to be displayed on a screen of a display device;
arranging a data measurement device at each of both feet of a user;
outputting, by the data measurement device, a transmission pulse for setting a pulse width of the transmitted ultrasonic wave to the ultrasonic transmission/reception devices mounted on each of the both feet of the user;
transmitting the sensor data and the propagation data to the step width measurement device; and
detecting a gait parameter in walking of the user based on the sensor data and control the data measurement device according to a timing at which the gait parameter is detected,
wherein a midstance stage is detected based on time series data of a parameter related to the spatial acceleration or the spatial angular velocity included in the sensor data generated by the data measurement device, and
wherein controlling the data measurement device is outputting the transmission pulse to the ultrasonic transmission/reception device mounted on a foot in which the midstance stage is detected.

* * * * *